(12) United States Patent
Kinugasa et al.

(10) Patent No.: US 11,207,779 B2
(45) Date of Patent: Dec. 28, 2021

(54) METHOD AND DEVICE FOR DETECTING ABNORMALITY OF ENCODER, AND ROBOT CONTROL SYSTEM

(71) Applicant: Panasonic Intellectual Property Management Co., Ltd., Osaka (JP)

(72) Inventors: Yasuhiro Kinugasa, Osaka (JP); Kei Aimi, Osaka (JP); Atsumi Hashimoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 352 days.

(21) Appl. No.: 16/324,918

(22) PCT Filed: Sep. 4, 2017

(86) PCT No.: PCT/JP2017/031701
§ 371 (c)(1),
(2) Date: Feb. 12, 2019

(87) PCT Pub. No.: WO2018/079075
PCT Pub. Date: May 3, 2018

(65) Prior Publication Data
US 2020/0047344 A1 Feb. 13, 2020

(30) Foreign Application Priority Data

Oct. 24, 2016 (JP) .............................. JP2016-207568
Jan. 16, 2017 (JP) .............................. JP2017-005058

(51) Int. Cl.
*B25J 9/00* (2006.01)
*B25J 9/16* (2006.01)
(Continued)

(52) U.S. Cl.
CPC ........... *B25J 9/1674* (2013.01); *B25J 9/1692* (2013.01); *B25J 9/1694* (2013.01); *B25J 19/06* (2013.01); *G05B 23/0218* (2013.01)

(58) Field of Classification Search
CPC ...... B25J 9/1674; B25J 9/1692; B25J 9/1694; B25J 19/06; G05B 23/0218; G05B 9/02; G01D 5/24466
See application file for complete search history.

(56) References Cited

U.S. PATENT DOCUMENTS 4,541,770 A * 9/1985 Niinomi ................... B25J 9/009
414/730
2010/0295497 A1* 11/2010 Takamatsu .............. H02P 23/18
318/671
(Continued)

FOREIGN PATENT DOCUMENTS

CN 104349873 2/2015
DE 10 2011 017 221 10/2011
(Continued)

OTHER PUBLICATIONS

International Search Report of PCT application No. PCT/JP2017/031701 dated Oct. 10, 2017.
(Continued)

*Primary Examiner* — Ian Jen
(74) *Attorney, Agent, or Firm* — Wenderoth, Lind & Ponack, L.L.P.

(57) ABSTRACT

An abnormality detection method of an encoder includes an output step, a control step, an information acquisition step, and an abnormality determination step. The abnormality determination step compares command position information with detection position information of a motor calculated based on an output signal, and determines that the encoder is abnormal in a case where a difference between the
(Continued)

command position information and the detection position information of the motor is equal to or more than a predetermined value.

19 Claims, 18 Drawing Sheets

(51) Int. Cl.
   *B25J 19/06*      (2006.01)
   *G05B 23/02*      (2006.01)

(56) References Cited

U.S. PATENT DOCUMENTS

| | | |
|---|---|---|
| 2011/0202308 A1 | 8/2011 | Kishida et al. |
| 2011/0221377 A1* | 9/2011 | Ueno .................... G05B 19/18 318/565 |
| 2011/0257785 A1 | 10/2011 | Nihei et al. |
| 2013/0000480 A1 | 1/2013 | Komatsu et al. |
| 2013/0193894 A1 | 8/2013 | Kiguchi et al. |
| 2014/0214204 A1* | 7/2014 | Toshimitsu ............ B25J 9/1646 700/253 |
| 2015/0105905 A1* | 4/2015 | Nishida ................. B25J 9/1641 700/254 |
| 2015/0112481 A1* | 4/2015 | Burns .................... A61B 34/30 700/248 |
| 2015/0142377 A1 | 5/2015 | Kishida et al. |
| 2017/0012568 A1 | 1/2017 | Kiguchi et al. |
| 2018/0212548 A1 | 7/2018 | Kiguchi et al. |
| 2019/0084157 A1* | 3/2019 | Goerg .................... B25J 9/1612 |
| 2020/0171661 A1* | 6/2020 | Kinugasa ............... G01D 5/244 |
| 2020/0173814 A1* | 6/2020 | Kinugasa ................ G01D 3/08 |
| 2021/0060784 A1* | 3/2021 | Kinugasa ............... B25J 13/088 |

FOREIGN PATENT DOCUMENTS

| | | | |
|---|---|---|---|
| EP | 2202593 A1 | 6/2010 | |
| EP | 2639556 A2 | 9/2013 | |
| EP | 2 857 151 | 4/2015 | |
| JP | 2005-186183 | 7/2005 | |
| JP | 2007-265103 | 10/2007 | |
| JP | 2013-000833 | 1/2013 | |
| JP | 2013-144325 | 7/2013 | |
| JP | 2013-179822 | 9/2013 | |
| JP | 2013179822 A * | 9/2013 | ............ H02P 29/024 |
| JP | 53676236 | 12/2013 | |
| JP | 56757616 | 2/2015 | |
| WO | 2012/081197 | 6/2012 | |
| WO | 2013/180223 | 12/2013 | |

OTHER PUBLICATIONS

The Extended European Search Report dated Aug. 23, 2019 for the related European Patent Application No. 17865073.5.
Communication pursuant to Article 94(3) EPC dated Sep. 14, 2020 in corresponding European Patent Application No. 17 865 073.5.
English Translation of Search Report dated Jun. 29, 2021 for related Chinese Patent Application No. 201780054089.1.

* cited by examiner

METHOD AND DEVICE FOR DETECTING ABNORMALITY OF ENCODER, AND ROBOT CONTROL SYSTEM

CROSS-REFERENCE TO RELATED APPLICATIONS

This application is a U.S. national stage application of the PCT International Application No. PCT/JP2017/031701 filed on Sep. 4, 2017, which claims the benefit of foreign priority of Japanese patent application 2017-005058 filed on Jan. 16, 2017 and Japanese patent application 2016-207568 filed on Oct. 24, 2016, the contents all of which are incorporated herein by reference.

TECHNICAL FIELD

The present disclosure relates to an abnormality detection method for detecting an abnormality of an encoder, and more particularly, to an abnormality detection method and an abnormality detection device of an encoder that detects a rotational position of a motor related to driving an output shaft of an operation device such as a robot.

BACKGROUND ART

In the related art, an abnormality detection technique related to a failure of an encoder used for detecting a rotational position of a motor that drives an output shaft of an operation device such as a robot is known.

PTL 1 discloses a technique in which a first encoder that detects rotation of an input shaft of a motor and a second encoder that detects rotation of an output shaft of the motor are provided and determination is made that the encoder is abnormal in a case where position measurement values detected by the first encoder and the second encoder have a certain difference or more.

PTL 2 discloses a servo system having a safety unit for monitoring that a motor is normally controlled. The safety unit according to PTL 2 generates a stop signal to a servo driver in a case where a command value or a feedback value received from the servo driver that controls the motor is abnormal.

CITATION LIST

Patent Literature

PTL 1: Japanese Patent No. 5675761
PTL 2: Japanese Patent No. 5367623

SUMMARY OF THE INVENTION

The present disclosure provides an abnormality detection method of an encoder for detecting an abnormality of the encoder that detects a rotational position of a motor by using a robot control unit.

The robot control unit has a controller, a driver, and an abnormality detection device.

The driver is connected to the encoder and the controller.

The abnormality detection device is connected to the encoder and the controller.

An abnormality detection method of an encoder includes an output step of outputting a speed command for instructing a rotational position of a motor, and command position information indicating the rotational position of the motor according to the speed command, a control step of receiving the speed command and an output signal output from the encoder, and controlling driving of the motor based on the speed command and the output signal, an information acquisition step of acquiring the command position information from the controller, and acquiring the output signal from the encoder, and an abnormality determination step of comparing the command position information with detection position information of the motor calculated based on the output signal, and determining that the encoder is abnormal in a case where a difference between the command position information and the detection position information of the motor is equal to or more than a predetermined value.

DESCRIPTION OF EMBODIMENTS

In many cases, only a single encoder is provided in a drive system (motor) of a general-purpose operation device in the related art, and the technique disclosed in PTL 1 cannot be applied to these general-purpose motors. In a case where the system according to PTL 1 is newly configured, it is necessary to provide a plurality of sensors, which increases the cost.

In a case where the technique disclosed in PTL 2 is applied to a general-purpose system not having an abnormality detection function, it is necessary to add a new function to the servo driver. In other words, it is necessary to develop both the servo driver and the safety unit, which takes time.

Figure 22:
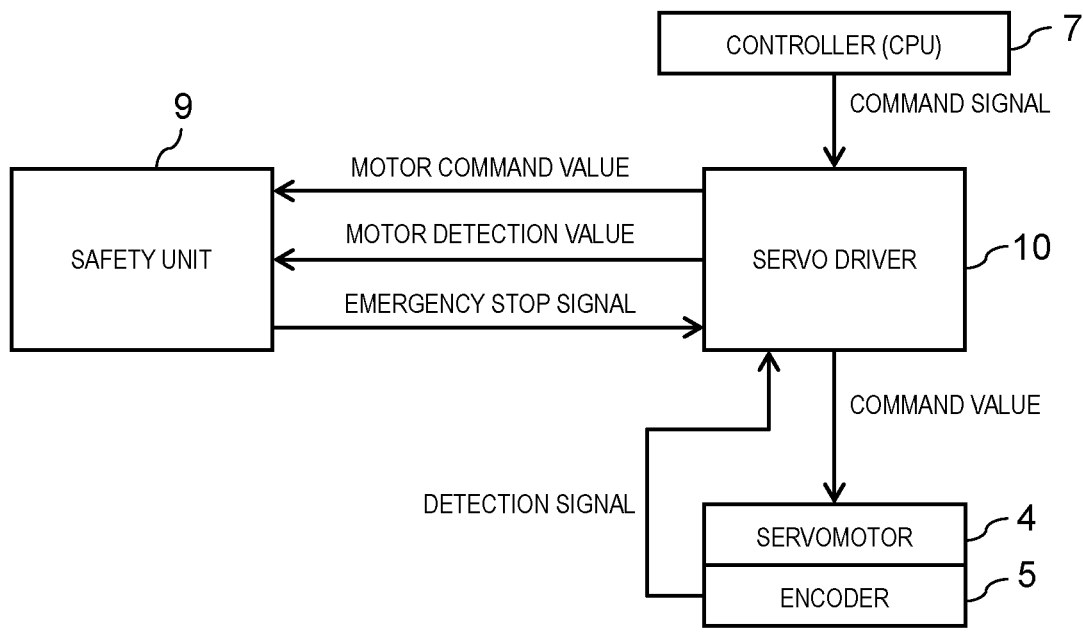
FIG. 22 is a block diagram showing a configuration of a robot control unit according to the related art.

FIG. 22 is a block diagram showing a configuration of a robot control unit according to the related art disclosed in PTL 2. Controller 7 outputs a command signal to servo driver 10, and servo driver 10 controls motor 4 based on the command signal received from controller 7 and a detection signal acquired from encoder 5.

Servo driver 10 generates a command value for a comparison process related to a rotational position of motor 4 (motor command value) based on the command signal received from controller 7, and outputs the command value to safety unit 9. Similarly, servo driver 10 generates a value indicating the rotational position of motor 4 (motor detection value) based on an output signal acquired from encoder 5, a reduction ratio of each axis of motor 4, origin information of motor 4, and the like, and outputs the value to safety unit 9. Safety unit 9 compares the motor command value and the motor detection value, which are received from servo driver 10, and determines an abnormality of encoder 5 based on the comparison result.

However, in a case where the configuration shown in FIG. 22 is applied to a general-purpose robot not having the abnormality detection device of encoder 5, servo driver 10 of the general-purpose robot usually does not have the function of generating the motor command value and the motor detection value and the function of outputting the generated motor command value and motor detection value.

Therefore, it is necessary to newly design a circuit, a program, and the like having the generation function and the output function. It is necessary to have a mechanism (circuit, program, display, or the like) indicating whether or not the additionally designed circuit, program, and the like are correctly functioning. That is, it takes time and effort and the process becomes complicated.

Hereinafter, the exemplary embodiment will be described in detail with reference to the drawings. The following descriptions of exemplary embodiments are merely illustrative.

First Exemplary Embodiment

<Configuration of Robot and Robot Control System>

Figure 1:
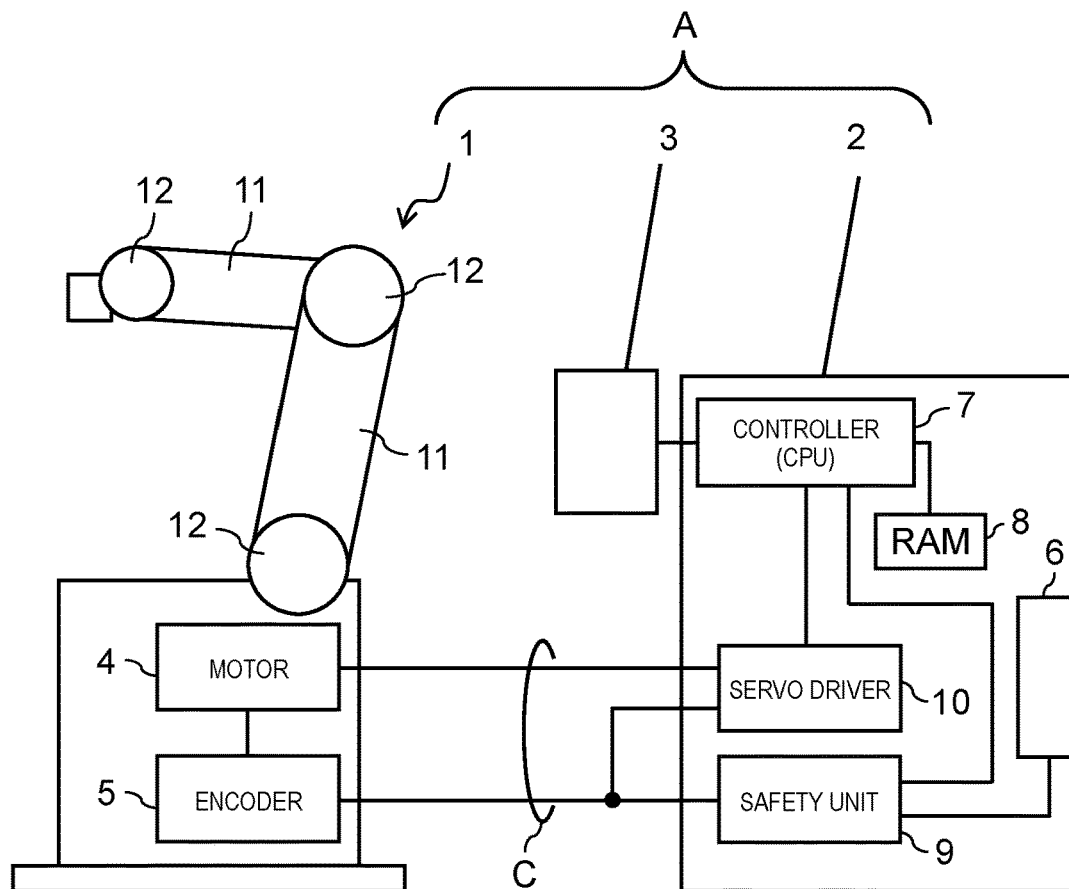
FIG. 1 is a schematic configuration diagram of a robot control system according to an exemplary embodiment.
Figure 2:
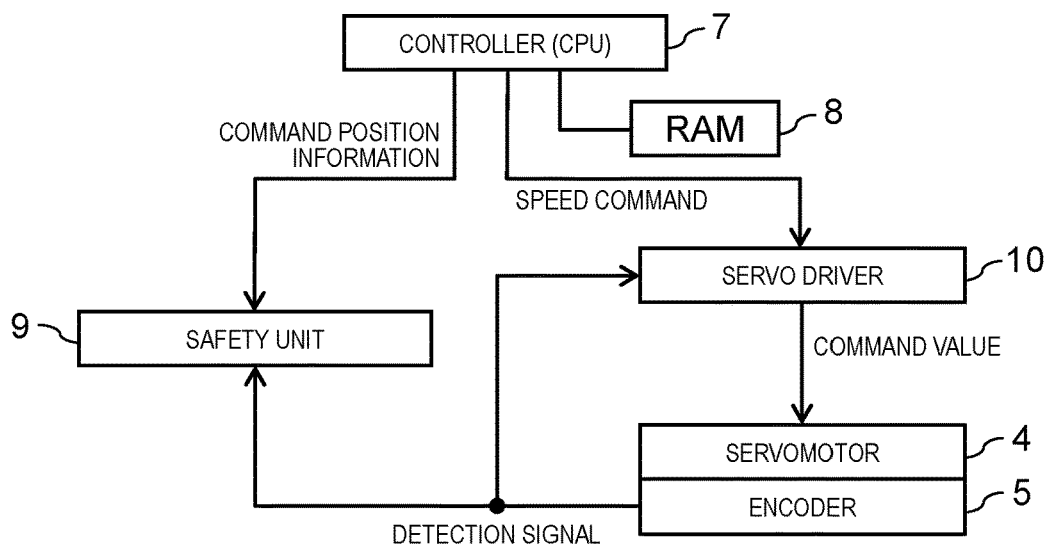
FIG. 2 is a block diagram showing a configuration of a robot control unit according to a first exemplary embodiment.

FIG. 1 is a schematic configuration diagram of a robot control system as an operation device according to the exemplary embodiment. FIG. 2 is a block diagram showing a configuration of robot control unit 2, and arrows are shown so that a transmission direction of information or signals can be known.

As shown in FIG. 1, robot A includes robot mechanism part 1, robot control unit 2, and operating part 3 with a display. Robot mechanism part 1 and robot control unit 2 are connected to each other using connection cable C. In FIG. 1, it is assumed that information is transmitted by wired connection using connection cable C. However, the connection form is not limited to the wired connection, and may be wirelessly connected. The connection between respective blocks is also the same.

Robot mechanism part 1 has a plurality of robot arms 11 and a plurality of joint shafts 12. Motor 4 (servomotor) for operating robot arms 11 is attached to each of robot arms 11. For example, in a case where robot A is a vertical articulated six-axis robot, robot A has six robot arms 11, and six motors 4 are provided so as to correspond to each of robot arms 11. Encoder 5 for detecting a rotational position of each of motors 4 or a rotation amount based on the rotational position is attached to each of motors 4.

Although not shown in FIG. 1, an external shaft that is driven based on drive control from robot control unit 2 to robot mechanism part 1 is attached to robot A. The external shaft is used in combination with robot mechanism part 1 in order to enlarge a movable range of robot A. Motor 4 for operating the external shaft is attached to the external shaft. Encoder 5 for detecting a rotational position of motor 4 or a rotation amount based on the rotational position is attached to motor 4. That is, each of motors 4 is provided for each of the plurality of joint shafts 12 and the external shaft, and encoder 5 is attached to each of motors 4. The type of the external shaft is not particularly limited. For example, the technique according to the exemplary embodiment can be applied to either slider type or positioner type, and other types may be used.

In the exemplary embodiment, in order to facilitate understanding of the invention, motor 4 and encoder 5 that use the plurality of joint shafts 12, and motor 4 and encoder 5 used for the external shaft are illustrated without distinguishing them (see FIG. 1) and described. In the following description, in a case of motor 4 or encoder 5, it is meant to refer to both of that using the plurality of joint shafts 12 and that used for the external shaft. That is, the abnormality detection device and the abnormality detection method of encoder 5 described below can be applied to both encoder 5 attached to motor 4 for the plurality of joint shafts 12 and encoder 5 attached to motor 4 for the external shaft.

Encoder 5 is connected to safety unit 9 (abnormality detection device) which will be described later and servo driver 10 (driver), and outputs (feeds back) the detected signal to safety unit 9 and servo driver 10.

Operating part 3 includes an input unit (not shown) and a display (not shown) that receive an input operation of an operator of robot A. Operating part 3 communicates with robot control unit 2 based on the input operation from the operator. Accordingly, the operator can perform operation setting, operation control, and the like of robot arm 11 via operating part 3. The input unit may be configured with a touch panel, and the display and the input unit may be integrally configured.

Robot control unit 2 includes controller (for example, CPU) 7, random access memory (RAM) 8, safety unit 9 as an abnormality detection device, servo driver 10 for driving each of motors 4, and safety circuit (controller) 6 that receives an emergency stop signal for instruction of emergency stop from safety unit 9 to shut off power supply (not shown) for driving robot A. In the present disclosure, the robot control system includes encoder 5 and robot control unit 2.

RAM 8 stores a teaching program of robot A, function setting of robot A, and the like which are created by the operator using operating part 3.

Controller 7 outputs a speed command (distance advanced per unit time) to servo driver 10 based on the teaching program of robot A and the function setting of robot A stored in RAM 8 and then performs an operation command of robot A. Controller 7 integrates the speed command from the origin position and outputs the integrated value as command position information to safety unit 9. The speed command is calculated, for example, based on a reduction ratio of robot A, the origin position, and the like.

Servo driver 10 controls the operation of robot A by controlling motor 4 based on the speed command received from controller 7 and the output signal from encoder 5.

Safety unit 9 is directly connected to encoder 5 and controller 7. Then, based on detection position information of motor 4 calculated based on the output signal received from encoder 5 and command position information received from controller 7, safety unit 9 determines whether or not encoder 5 is faulty.

Figure 3:
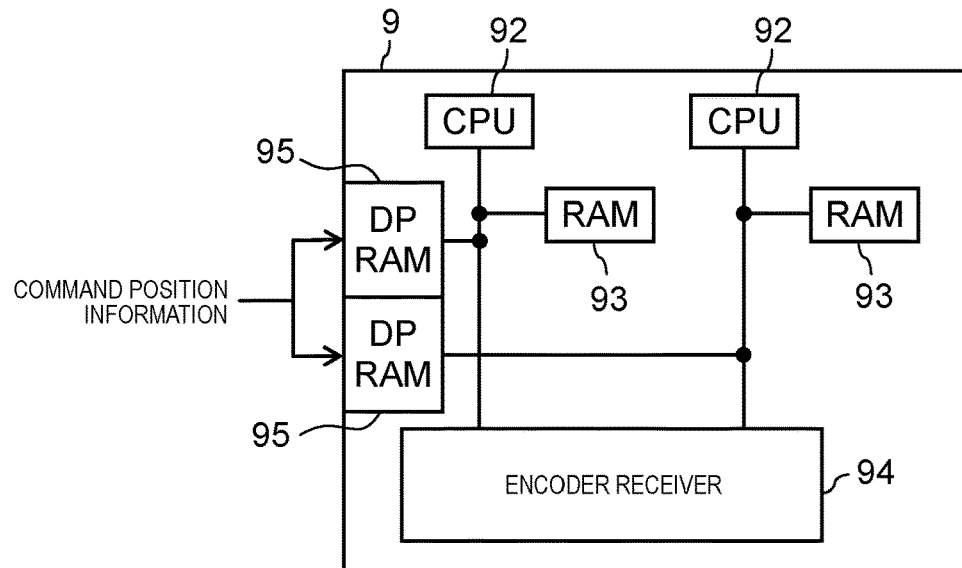
FIG. 3 is a block diagram showing a configuration of a safety unit according to the first exemplary embodiment.

FIG. 3 is a block diagram showing a configuration of safety unit 9.

As shown in FIG. 3, safety unit 9 has CPUs 92 as a determiner, RAMs 93, encoder receiver 94 as a first receiver, and dual port RAMs (DPRAMs) 95 as a second receiver.

Encoder receiver 94 is connected to encoder 5 and acquires an output signal from encoder 5.

DPRAM 95 is connected to controller 7 of robot control unit 2 and acquires the command position information output from controller 7. The command position information is obtained by integrating the speed command output from controller 7 to servo driver 10. The command position information acquired by DPRAM 95 is stored in RAM 93.

CPU 92 receives the output signal from encoder receiver 94, and calculates detection position information on the current position of motor 4 using the output signal, the reduction ratio of robot A, the origin position, and the like. Then, CPU 92 compares the command position based on the command position information with the detection position based on the detection position information, and confirms the presence or absence of the abnormality of encoder 5.

In FIG. 3, CPU 92, RAM 93, and DPRAM 95 are connected with the same configuration, and two sets having the same function are provided. Accordingly, parallel processing using two CPUs 92 is possible. That is, since it is possible to perform the same abnormality determination in duplicate, it is possible to further improve the reliability as compared with the case of one set.

<Method for Detecting Abnormality of Encoder>

Figure 4:
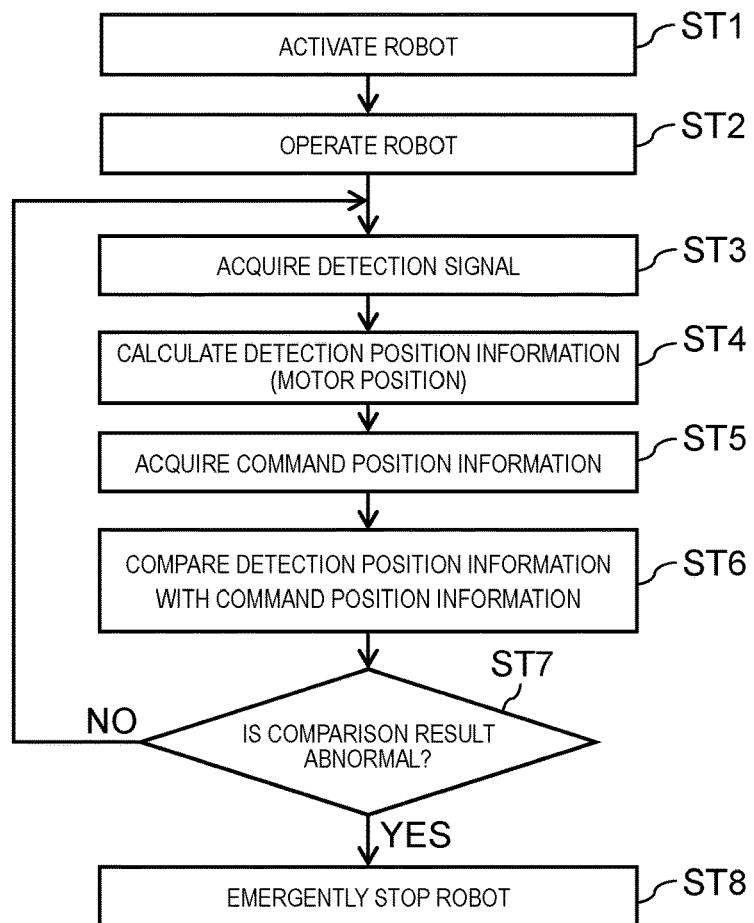
FIG. 4 is a flowchart showing an abnormality determination method of an encoder according to the first exemplary embodiment.

FIG. 4 is a flowchart showing how safety unit 9 monitors an abnormality of encoder 5 after robot control unit 2 activates robot A and robot A starts operating. That is, FIG. 4 shows how safety unit 9 monitors an abnormality of encoder 5 when controller 7 rotates motor 4 via servo driver 10.

In step ST1, controller 7 of robot control unit 2 activates robot A and the process proceeds to step ST2.

In step ST2, robot control unit 2 operates robot A based on the teaching program, the function setting, and the like, which are set by the operator via operating part 3. Specifically, controller 7 outputs the speed command to servo driver 10 and the command position information to safety unit 9 based on the teaching program, the function setting, and the like, which are stored in RAM 8. Servo driver 10 drives motor 4 based on the speed command received from controller 7 to operate joint shaft 12 and the external shaft of robot A. Servo driver 10 receives an output signal from encoder 5 attached to motor 4 and performs feedback control on motor 4 based on the difference between the speed command and the output signal. In this case, the output signal from encoder 5 is also output to safety unit 9.

The processes of steps ST3 to ST7 are performed by safety unit 9. In safety unit 9, when acquiring the output signal from encoder 5 (ST3), the position of the motor is calculated (ST4). Specifically, CPU 92 of safety unit 9 calculates the rotational position (detection position information) of motor 4 based on the output signal acquired from encoder 5, the reduction ratio of each axis of motor 4, the origin information of motor 4, and the like. The output signal acquired from encoder 5 is transmitted in the form of, for example, a pulse signal.

Safety unit 9 receives the command position information from controller 7 (ST5), and compares the detection position information on the current position of motor 4 calculated in ST4 with the command position information from controller 7 (ST6). Specifically, CPU 92 of safety unit 9 compares the rotational position of motor 4 (motor detection value: detection position information) calculated based on the output signal from encoder 5 with the rotational position of the motor (motor command value: command position information) commanded from controller 7.

As a result of the comparison, in a case where the difference between the motor command value (command position information) and the motor detection value (detection position information) is equal to or more than the predetermined value (YES in ST7), CPU 92 determines that encoder 5 is abnormal, and the process proceeds to step ST8. Meanwhile, in a case where the difference between the motor command value and the motor detection value is less than the predetermined value (NO in ST7), CPU 92 determines that encoder 5 is not abnormal, and the flow returns to step ST3.

Specifically, in drive control of robot A, motor 4 moves to the position commanded from controller 7. Therefore, the difference between the motor detection value (detection position information) indicating the rotational position of motor 4 and the motor command value (command position information) indicating the rotational position commanded from controller 7 naturally falls within a predetermined threshold Pth. When the rotational position of the motor based on the motor detection value is apart from the motor command position based on the motor command value by a predetermined position or more, it is determined that the encoder is faulty.

In step ST8, CPU 92 of safety unit 9 transmits an emergency stop signal to safety circuit 6. Upon receiving the emergency stop signal, safety circuit 6 shuts off the power supply for driving robot A and emergently stops robot A.

In this manner, after controller 7 activates robot A and causes robot A to start its operation, safety unit 9 repeatedly executes the processes of steps ST3 to ST7 to determine the abnormality of encoder 5.

As described above, according to the exemplary embodiment, in the abnormality detection of encoder 5, safety unit 9 compares the position information directly acquired from controller 7 with the position information calculated based on the output signal from encoder 5 and detects the abnormality of encoder 5 based on the comparison result. Accordingly, by adding safety unit 9 to an operation device such as a general-purpose robot not having an abnormality detection device of an encoder, it is possible to detect an abnormality due to the failure of the encoder. At that time, since it is unnecessary to change the design of components of existing general-purpose robots such as servo driver 10, an influence on the existing system can be reduced. Therefore, since it is unnecessary to indicate that the process relating to the abnormality determination of the encoder is correctly performed on the existing system, the process does not become complicated.

This point will be described in comparison with the related art shown in FIG. 22.

In a case where the configuration shown in FIG. 22 is applied to a general-purpose robot not having the abnormality detection device of encoder 5, servo driver 10 of the general-purpose robot usually does not have the function of generating the motor command value and the motor detection value and the function of outputting the generated motor command value and motor detection value. Therefore, it is necessary to newly design a circuit, a program, and the like having the generation function and the output function. It is necessary to have a mechanism (circuit, program, display, or the like) indicating whether or not the additionally designed circuit, program, and the like are functioning correctly. That is, it takes time and effort and the process becomes complicated. Meanwhile, the abnormality detection method and the abnormality detection device according to the present disclosure do not cause the above situation.

As described above, the first exemplary embodiment has been described as an example of the technique disclosed in the present application. However, the technique in the present disclosure is not limited to this, and can also be applied to exemplary embodiments in which changes, substitutions, additions, omissions and the like are made as appropriate.

For example, the first exemplary embodiment described above may be configured as follows.

Modification Example (1)

Figure 5:
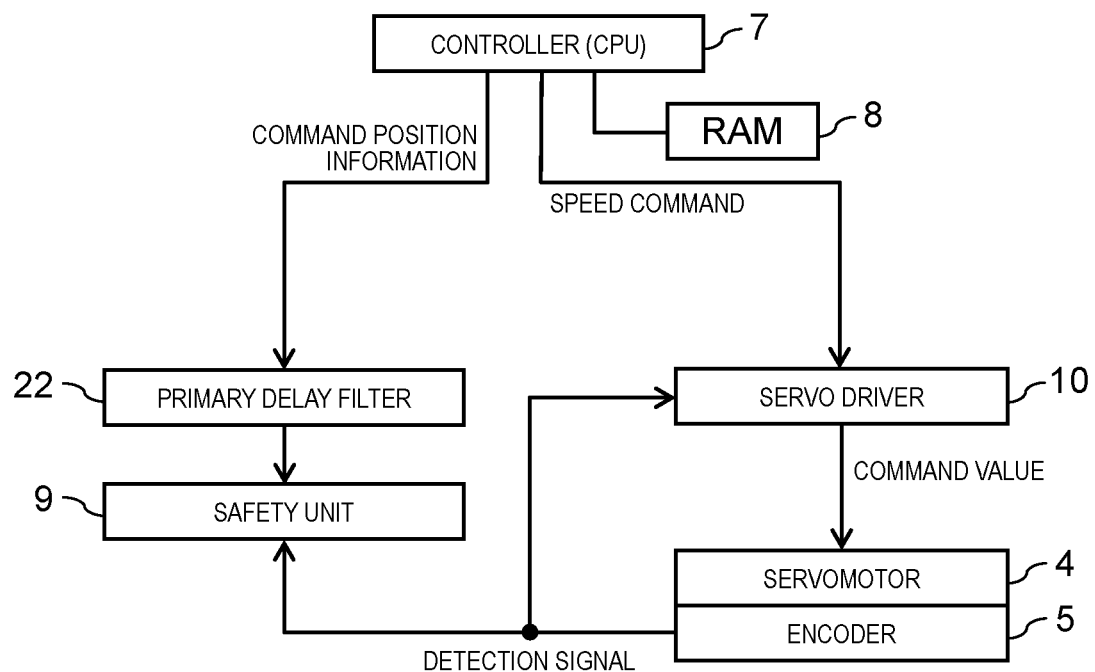
FIG. 5 is a block diagram showing another configuration example of the robot control unit according to the first exemplary embodiment.

FIG. 5 is a block diagram showing a configuration of a robot control unit according to a modification example (1).

In FIG. 5, in addition to the configuration of FIG. 2, primary delay filter 22 as a delay control filter considering a general control delay is provided between controller 7 and safety unit 9. That is, primary delay filter 22 is provided between controller 7 and DPRAM 95 (second receiver).

In actual control of robot A, in a case where comparison is made at the same time, the rotational position (motor command position) of motor 4 based on the command position information acquired from controller 7 by safety unit 9 and the rotational position (motor detection position) of motor 4 based on the output signal or the like acquired from encoder 5 by safety unit 9 may be deviated from each other. This occurs, for example, due to the characteristics of the motor control. Specifically, since servo driver 10 actually controls motor 4 after controller 7 of robot control unit 2 outputs the speed command and the command position information, and motor 4 operates based on the control, a certain time delay occurs.

Figure 6:
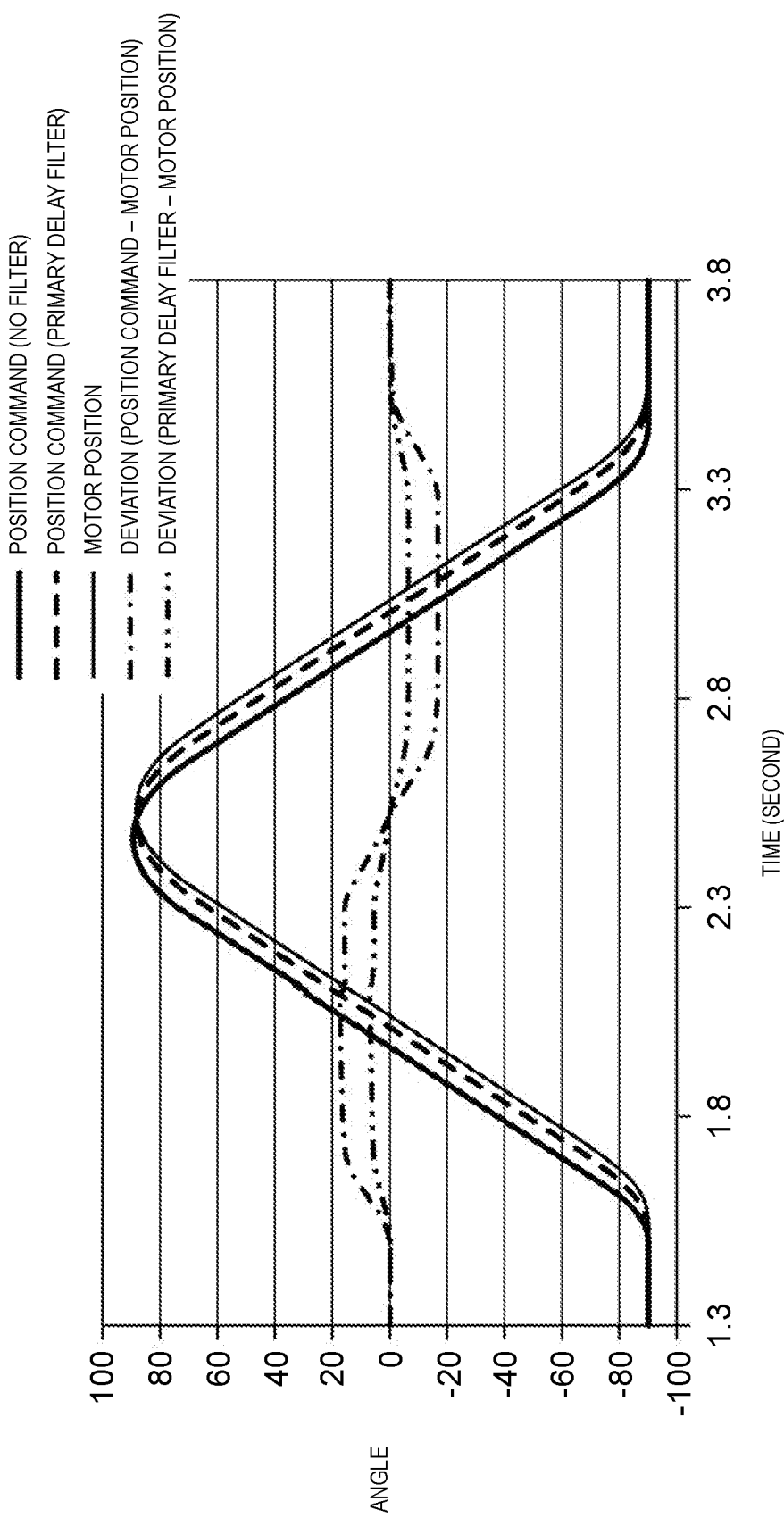
FIG. 6 is a diagram showing a relationship between a motor command position and a motor detection position according to the first exemplary embodiment.

FIG. 6 is a diagram showing a relationship between a motor command position (thick solid line in FIG. 6) and a motor detection position (thin solid line in FIG. 6) in a case where joint shaft 12 of robot arm 11 is reciprocated at the maximum speed. Comparing the thick solid line and the thin solid line in FIG. 6, there is a delay of about 0.1 seconds at the maximum, and when converted into an angle, a delay of about 18 degrees occurs (see the dash-dotted line in FIG. 6).

In contrast, as shown by the broken line and the two-dot chain line in FIG. 6, it is understood that the difference between the motor command position and the motor detection position is greatly decreased by providing primary delay filter 22. In FIG. 6, the broken line shows the motor command position according to the configuration of FIG. 5, and the two-dot chain line shows the deviation between the motor command position and the motor detection position according to the configuration of FIG. 5.

By adopting the configuration as shown in FIG. 5, it becomes possible to determine the abnormality of the encoder with higher accuracy as compared with the configuration of FIG. 2. Specifically, the predetermined threshold value Pth used for comparing the detection position information with the command position information may be determined based on the difference between the motor command position and the motor detection position. In this case, as the difference between the motor command position and the motor detection position decreases, the predetermined threshold value Pth can be reduced, and as a result, the abnormality detection accuracy of the encoder can be improved.

Since the abnormality detection method of encoder 5 may be the same as the procedure described with reference to FIG. 4, the detailed description thereof is omitted here.

Modification Example (2)

Figure 7:
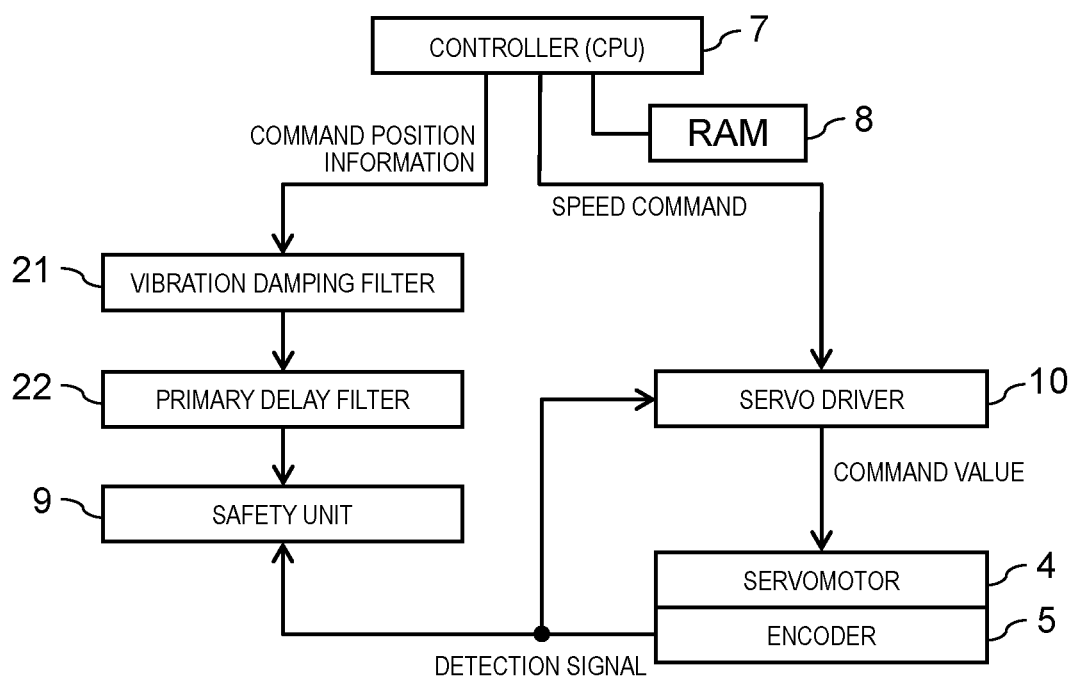
FIG. 7 is a block diagram showing another configuration example of the robot control unit according to the first exemplary embodiment.

FIG. 7 is a block diagram showing a configuration of a robot control unit according to a modification example (2).

In FIG. 7, in addition to the configuration of FIG. 6, vibration damping filter 21 connected in series with primary delay filter 22 is provided between controller 7 and safety unit 9.

In actual control of robot A, there are cases where control with higher responsiveness (hereinafter referred to as high responsive control) is performed depending on the contents of the operation control of servo driver 10. For example, in a welding robot using a laser, control is performed with high-speed control and tracking ability improved. In a case where such high responsive control is performed, motor 4 may vibrate due to an excitation component included in the command position information. Therefore, in order to suppress the vibration of motor 4, a vibration damping filter (not shown) is used between servo driver 10 and motor 4. In a case where the high responsive control is performed, by adopting the configuration as shown in FIG. 7, it is possible to create a command that is close to the control by servo driver 10.

Figure 8:
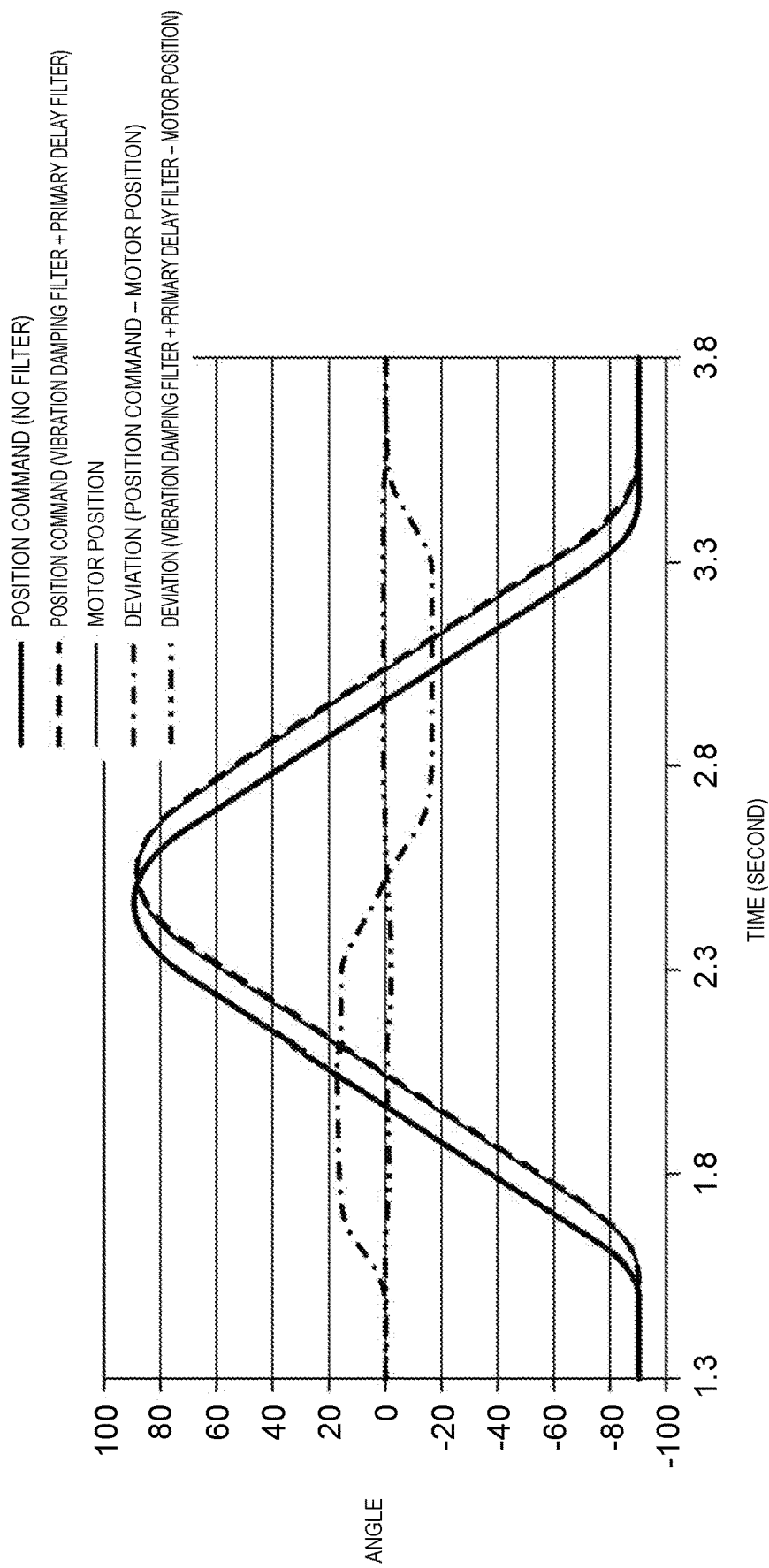
FIG. 8 is a diagram showing a relationship between the motor command position and the motor detection position according to the first exemplary embodiment.

FIG. 8 shows a relationship between a motor command position and a motor detection position in a case where joint shaft 12 of robot arm 11 is reciprocated at the maximum speed. The thick solid line and the thin solid line are the same as in FIG. 6, and show the operation related to the configuration not using primary delay filter 22 and vibration damping filter 21 (see FIG. 2). In FIG. 8, the broken line shows the change in the motor command position according to the configuration of FIG. 7, and the two-dot chain line shows the deviation between the motor command position and the motor detection position according to the configuration of FIG. 7. It is understood from FIG. 8 that the difference between the motor command position and the motor detection position is further decreased by providing vibration damping filter 21 in addition to primary delay filter 22.

By adopting the configuration as shown in FIG. 7, it becomes possible to determine the abnormality of the encoder with higher accuracy as compared with the configuration of FIG. 2 or FIG. 5. Specifically, for example, similar to the modification example (1), the predetermined threshold value Pth can be reduced, and as a result, the abnormality detection accuracy of the encoder can be improved. Vibration damping filter 21 removes a resonance component from the input command position information. Further, both vibration damping filter 21 and primary delay filter 22 may be directly provided in random order, or only one of them may be provided.

In FIG. 7, the positions of vibration damping filter 21 and primary delay filter 22 may be interchanged.

Modification Example (3)

Figure 9:
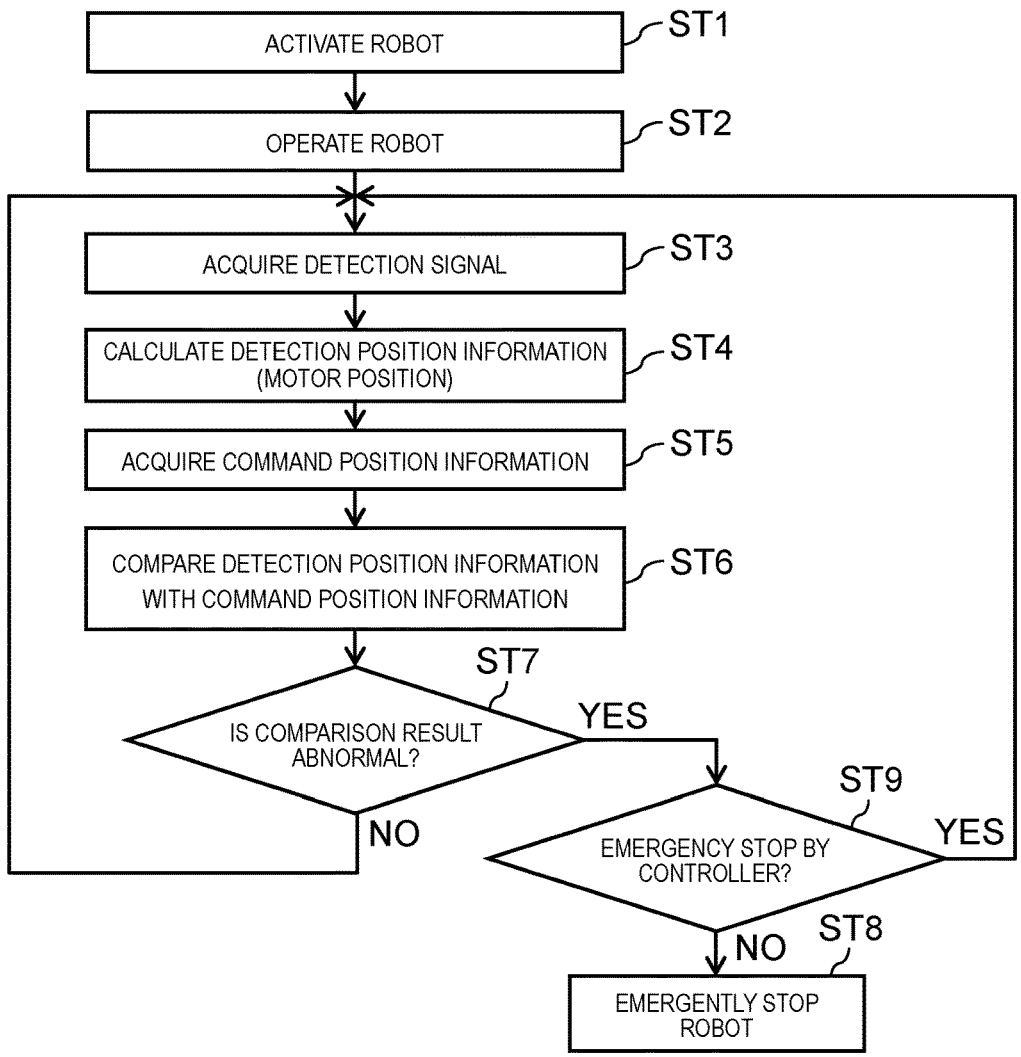
FIG. 9 is a flowchart showing another example of the abnormality determination method of the encoder according to the first exemplary embodiment.

In the abnormality determination method according to FIG. 4, a flowchart as shown in FIG. 9 may be used. In FIG. 9, since the processes relating to steps ST1 to ST6 are the same as those in FIG. 4, the detailed description thereof is omitted here.

In FIG. 9, in step ST7, in a case where the difference between the motor command value and the motor detection value is equal to or more than the predetermined value, that is, in a case of "YES" in step ST7, the process proceeds to step ST9. In step ST9, CPU 92 of safety unit 9 determines whether or not the emergency stop of robot A is instructed by controller 7.

Specifically, in a case where the emergency stop of robot A is performed, controller 7 outputs an emergency stop signal (not shown) to safety circuit 6. Upon receiving the emergency stop signal, safety circuit 6 shuts off the power supply for driving robot A and stops robot A. In the modification example (3), safety unit 9 acquires the emergency stop signal from controller 7. In step ST9, safety unit 9 determines whether or not the emergency stop signal is output from controller 7. In a case where the emergency stop signal is output from controller 7 (YES in ST9), the flow returns to step ST3. That is, even in a case where the difference between the motor command value and the motor detection value is equal to or more than the predetermined value, safety unit 9 does not determine that encoder 5 is abnormal.

Meanwhile, in a case where the emergency stop signal is not output from controller 7 (NO in ST9), the process proceeds to step ST8. In step ST8, CPU 92 of safety unit 9 transmits the emergency stop signal to safety circuit 6, and safety circuit 6 which has received the emergency stop signal emergently stops robot A.

By performing the process of step ST9 after step ST7 in this way, in a case where the emergency stop is made by the instruction from controller 7, safety unit 9 does not erroneously determine that encoder 5 is abnormal. Specifically, in a case where controller 7 stops robot A by outputting an emergency stop signal, the output of the command position information of controller 7 is stopped. Therefore, when the comparison between the motor command value and the motor detection value is continued in safety unit 9, in the flowchart of FIG. 4, determination may be made that the encoder is abnormal despite the normal operation of encoder 5. However, by performing the processes according to the exemplary embodiment, occurrence of such a problem can be prevented.

In the flows of FIGS. 4 and 9, the steps do not necessarily have to be processed in the order described, and in a case where the order can be changed or parallel processing can be performed, the order of processes and the processing method may be changed as appropriate. For example, the processes relating to steps ST3 and ST4 and the process relating to step ST5 may be performed in parallel.

Second Exemplary Embodiment

In the exemplary embodiment, a method for detecting an abnormality of an encoder related to continuous operation of robot A will be described.

Even in a case of continuously operating robot A, since the basic configuration and operation are the same as those in the first exemplary embodiment, the detailed description thereof is omitted here, and parts related to the continuous operation will be described in detail.

Figure 10:
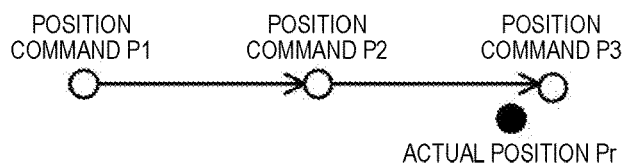
FIG. 10 is a diagram showing a relationship between a motor command position and an actual position in a case where an advancing operation is performed according to a second exemplary embodiment.

FIG. 10 shows a relationship between motor command positions P1 to P3 in a case where the motor command position moves sequentially from P1 to P3 via P2 based on the speed command from controller 7, that is, a so-called advancing operation is performed, and actual position Pr of the motor (hereinafter also referred to as current position Pr). In the advancing operation as shown in FIG. 10, when the motor command position moves to P3, current position Pr is present in the vicinity of P3. Therefore, it is possible to detect an abnormality of encoder 5 by performing the process in accordance with the flow of FIG. 4 or 9.

Figure 11:
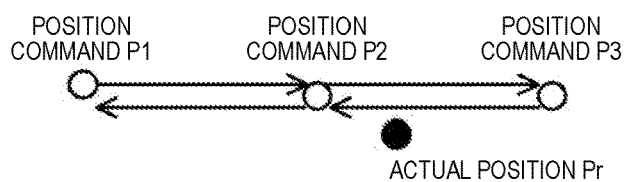
FIG. 11 is a diagram showing a relationship between a motor command position and an actual position in a case where a reciprocating operation is performed according to the second exemplary embodiment.

Meanwhile, as shown in FIG. 11, in a case where the motor command position sequentially moves from P1 to P3 via P2 and then returns to P1 via P2 based on the speed command from controller 7, that is, a so-called reciprocating operation is performed, safety unit 9 may erroneously determine that encoder 5 is abnormal. For example, in a case where the reciprocating operation in FIG. 11 is performed at a high speed, before current position Pr of motor 4 reaches P3 or approaches sufficiently P3, servo driver 10 starts a returning operation to motor 4, and current position Pr may perform the returning operation from P2 to P1. In such a case, when safety unit 9 compares the motor command position based on command position information P3 with the motor detection position based on current position Pr of motor 4, due to the large difference between position P3 and position Pr, safety unit 9 may determine that encoder 5 is abnormal despite the normal operation of encoder 5.

Figure 12:
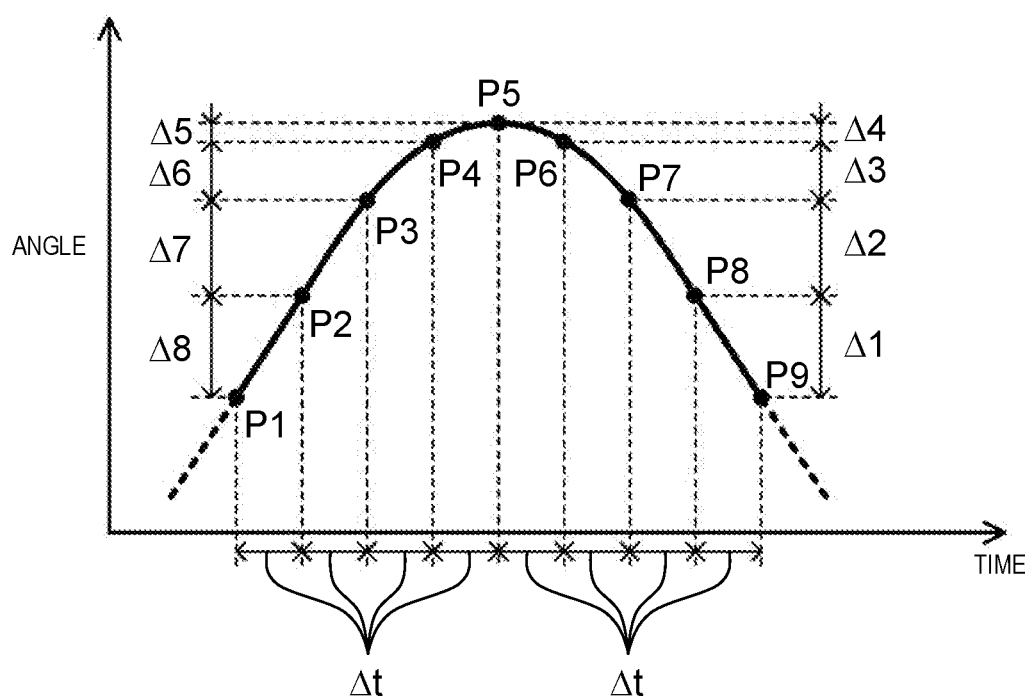
FIG. 12 is a diagram showing a relationship between a motor command position and a motor detection position according to the second exemplary embodiment.

In step ST6 of FIGS. 4 and 9, CPU 92 performs a process that adds a change amount Δn (difference amount Δn from the immediately preceding command position) of the motor command value based on the command position information by predetermined n times (for example, five times). Specifically, for example, in a case where the reciprocating operation is performed from point P1 (position P1) to point P9 (position P9) as indicated by the solid line in FIG. 12, five times from Δ1 to Δ5 are added. That is, the added value Δ is Δ=Δ1+Δ2+Δ3+Δ4+Δ5. FIG. 12 is a diagram showing a motor command position in a case where joint shaft 12 of robot arm 11 is reciprocated.

In step ST6, CPU 92 compares the value obtained by adding or decreasing the added value Δ to the motor command value with the motor detection value calculated based on the detection position information, and in step ST7, CPU 92 determines whether or not the encoder is abnormal based on the comparison result. Specifically, in a case where motor detection value P (fs) satisfies the condition of Expression (1) below, CPU 92 determines that encoder 5 is not abnormal. In this case, the change amount Δn is added by an absolute value regardless of a direction of the change.

$$Pn-\Delta \leq P(fs) \leq Pn+\Delta \quad (\Delta=\Delta 1+\Delta 2+\Delta 3+\Delta 4+\Delta 5+ \ldots +\Delta n) \quad \text{Expression (1)}$$

Thus, in the specific robot operation method such as the reciprocating operation, it is possible to prevent CPU 92 from determining that encoder 5 is abnormal despite the normal operation of encoder 5.

In a case where the abnormality detection method of encoder 5 is adopted as described above, robot A may not operate for a predetermined period in some cases. Therefore, in step ST7, instead of the above Expression (1), a predetermined threshold value Th may be added to the added value Δ as shown in the following Expression (2).

$$Pn-\Delta \leq P(fs) \leq Pn+\Delta \quad (\Delta=\Delta 1+\Delta 2+\Delta 3+\Delta 4+\Delta 5+ \ldots +\Delta n+Th) \quad \text{Expression (2)}$$

By providing such a threshold value Th, in a case where the command position information is not changed from controller 7 over a predetermined period, that is, in a case where controller 7 issues an instruction to robot A not to move for a predetermined period, safety unit 9 can detect an abnormality, and the operation of robot A can be emergently stopped even when the robot is performing an unintended operation of a control device.

Third Exemplary Embodiment

The difference between the configuration shown in the exemplary embodiment and the configuration shown in the first exemplary embodiment resides in switching processing routes of command position information in consideration of switching between high responsive control and normal control.

For example, dynamic control switching may be performed such as shortening takt time by performing high responsive control with respect to the driving of the robot in a laser welding section where high-precision operation is required, such as when laser welding is performed with a laser injection device attached to the hand of the robot, and by performing normal control in a section where other speeds are prioritized with respect to the driving of the robot. In order to reduce errors occurring when the command position information and the detection position information are compared with each other, the use of vibration damping filter 21 and primary delay filter 22 shown in the modification examples (1) and (2) is as already described above. However, in a case of performing the above-described control switching, when these filters are used as they are, the difference between the actual operation of robot A and the command position information given to safety unit 9 becomes large, and the abnormality detection accuracy of encoder 5 may not be improved.

Therefore, in the present disclosure, by switching the routes for processing the command position information transmitted to safety unit 9 according to the control method actually performed by controller 7, it is possible to detect the abnormality of encoder 5 with high accuracy even though the control mode of robot A is switched.

Hereinafter, it will be specifically described with reference to the drawings.

Figure 13:
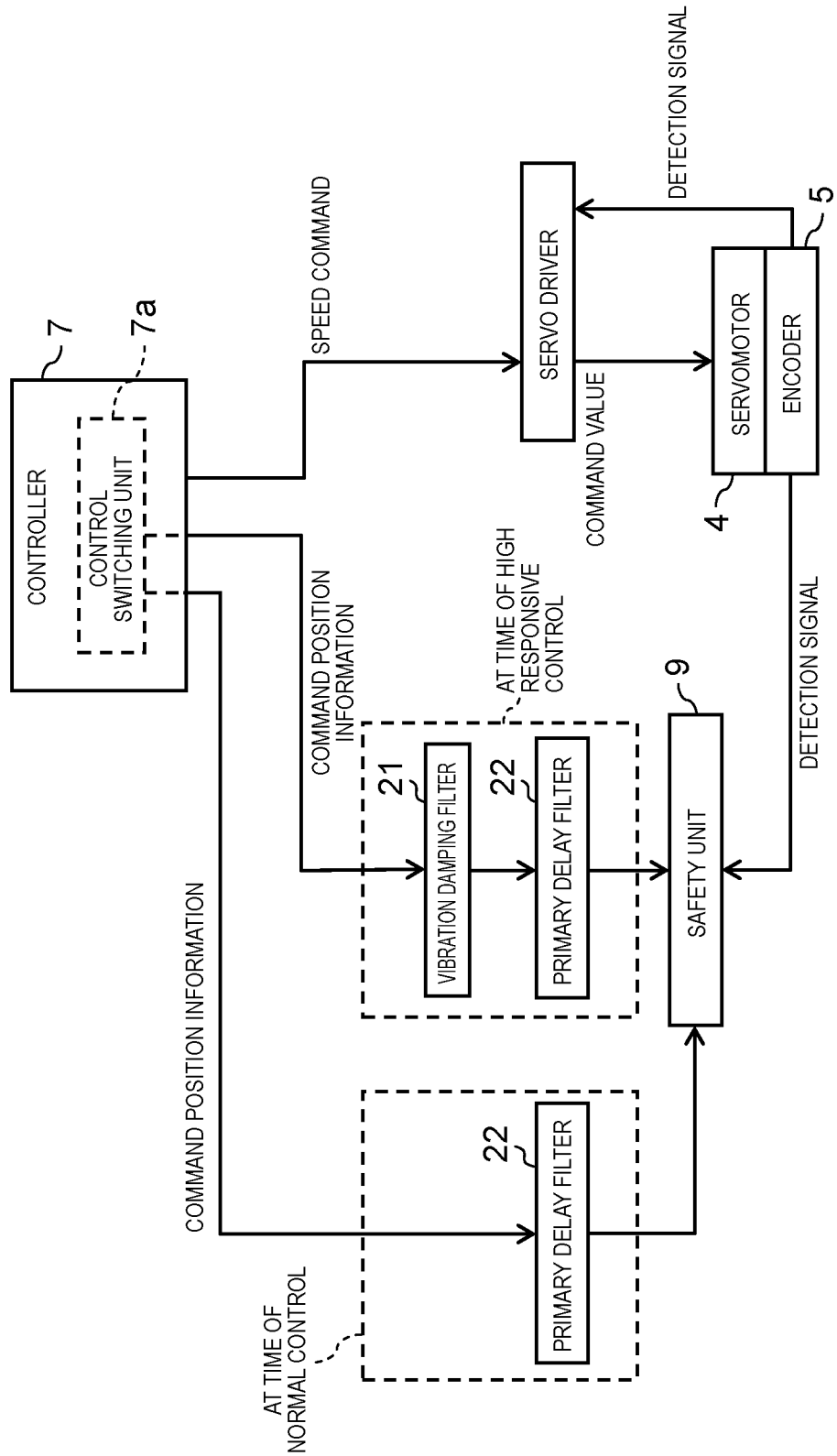
FIG. 13 is a block diagram showing a configuration of a robot control unit according to a third exemplary embodiment.

FIG. 13 shows a configuration of a robot control unit according to the exemplary embodiment. The difference between this configuration and the configuration shown in FIG. 7, for example, is that controller 7 has control switching unit 7a for switching the drive control of robot A. When the drive control mode of robot A is switched by a teaching program or an input from operating part 3, control switching unit 7a detects the switching and switches the route to transmit the command position information. As shown in FIG. 13, in a case where normal control is performed, command position information is transmitted to safety unit 9 after applying primary delay filter 22 (first delay control filter). In a case where high responsive control is performed, the command position information is transmitted to safety unit 9 after applying vibration damping filter 21 and primary delay filter 22 (second delay control filter). In FIG. 13, same primary delay filters 22 are used for both normal control and high responsive control. That is, filters 22 having the same time constant are used.

The function of control switching unit 7a may be realized on the hardware of controller 7 or may be realized on the software.

Figure 14:
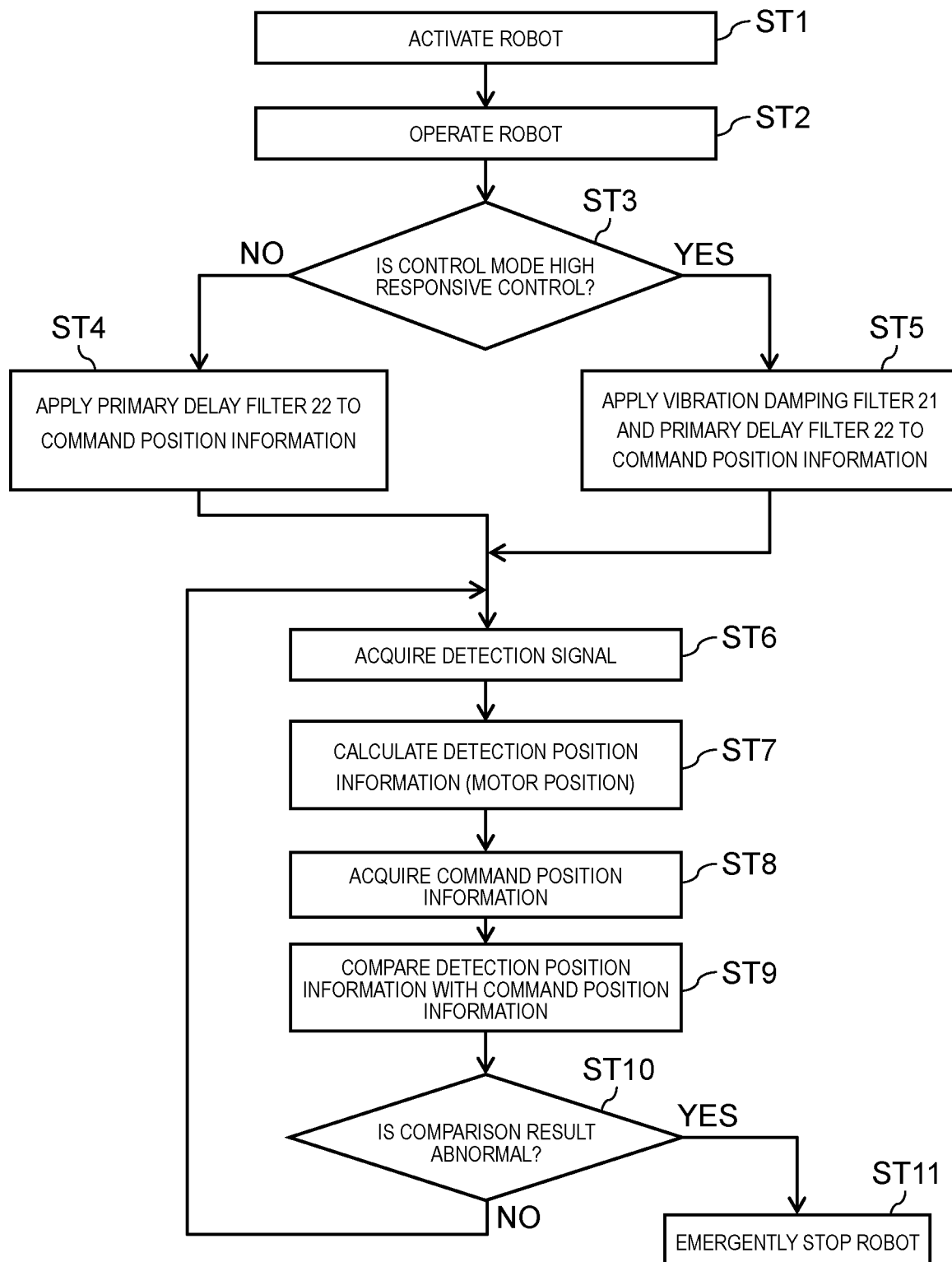
FIG. 14 is a flowchart showing an abnormality determination method of an encoder according to the third exemplary embodiment.

FIG. 14 is a flowchart showing an abnormality determination method of encoder 5 according to the exemplary embodiment.

That is, FIG. 14 shows how safety unit 9 monitors an abnormality of encoder 5 when controller 7 rotates motor 4 via servo driver 10.

In FIG. 14, since the processes relating to steps ST1, ST2, and ST6 to ST11 are the same as steps ST1 to ST8 shown in FIG. 4, the detailed description thereof is omitted here.

In step ST3, it is determined whether or not the drive control mode of robot A is high responsive control. This determination is made by control switching unit 7a in controller 7 as described above.

In a case where the determination in step ST3 is positive, that is, when the drive control mode of robot A is high responsive control, the command position information is transmitted to safety unit 9 after vibration damping filter 21 and primary delay filter 22 are applied in step ST4.

In a case where the determination in step ST3 is negative, that is, when the drive control mode of robot A is normal control, the command position information is transmitted to safety unit 9 after primary delay filter 22 is applied in step ST5.

As described above, according to the exemplary embodiment, by switching transmission routes of the command position information transmitted from controller 7 to safety unit 9 depending on the drive control mode of robot A, the abnormality detection accuracy of encoder 5 can be improved.

For example, when the drive control mode of robot A is high responsive control, by applying vibration damping filter 21 for removing an excitation component included in the command position information and primary delay filter 22 for reducing a response delay of control to the command position information, the abnormality detection accuracy of encoder 5 can be improved.

Meanwhile, when the drive control mode of robot A is normal control, removal of the excitation component included in the command position information may not be taken into consideration in many cases. Vibration damping filter 21 is not applied, and primary delay filter 22 is applied to the command position information. Accordingly, occurrence of an unexpected error is suppressed and the abnormality detection accuracy of encoder 5 can be improved.

As described above, the third exemplary embodiment has been described as an example of the technique disclosed in the present application. However, the technique in the present disclosure is not limited to this, and can also be applied to exemplary embodiments in which changes, substitutions, additions, omissions and the like are made as appropriate. For example, the third exemplary embodiment described above may be configured as follows.

Modification Example (4)

Figure 15:
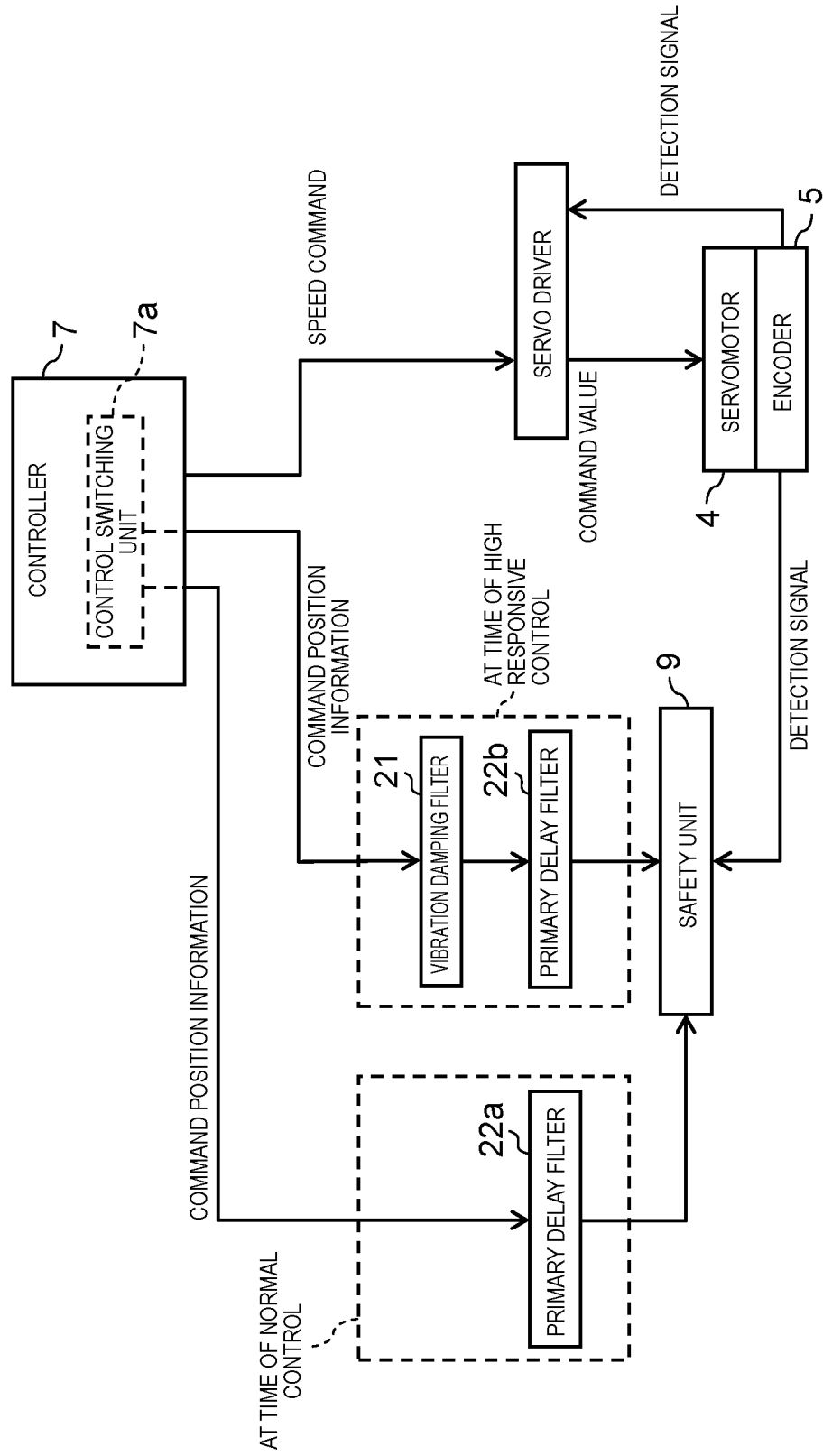
FIG. 15 is a block diagram showing another configuration of the robot control unit according to the third exemplary embodiment.

FIG. 15 is a block diagram showing a configuration of a robot control unit according to a modification example (4). The configuration shown in FIG. 15 is different from the configuration shown in FIG. 13 in that primary delay filters to which the command position information is applied differ between at the time of normal control and at the time of high responsive control. Specifically, in the configuration shown in FIG. 15, primary delay filter 22a and primary delay filter 22b are used. With this configuration, a compensation amount of the time delay of the command position information varies depending on the switching between the processing routes.

In actual drive control of robot A, since servo driver 10 actually controls motor 4 after controller 7 of robot control unit 2 outputs the speed command and the command position information, and motor 4 operates based on the control, a certain time delay occurs in the actual position with respect to the command position information. This delay occurs in both cases of high responsive control and normal control, and the delay time may vary depending on the control modes.

Therefore, as shown in FIG. 15, by using primary delay filters 22a and 22b having different control delay time constants depending on the control modes, it becomes possible to detect the abnormality of the encoder with higher accuracy as compared with the configuration shown in FIG. 13.

Modification Example (5)

Figure 16:
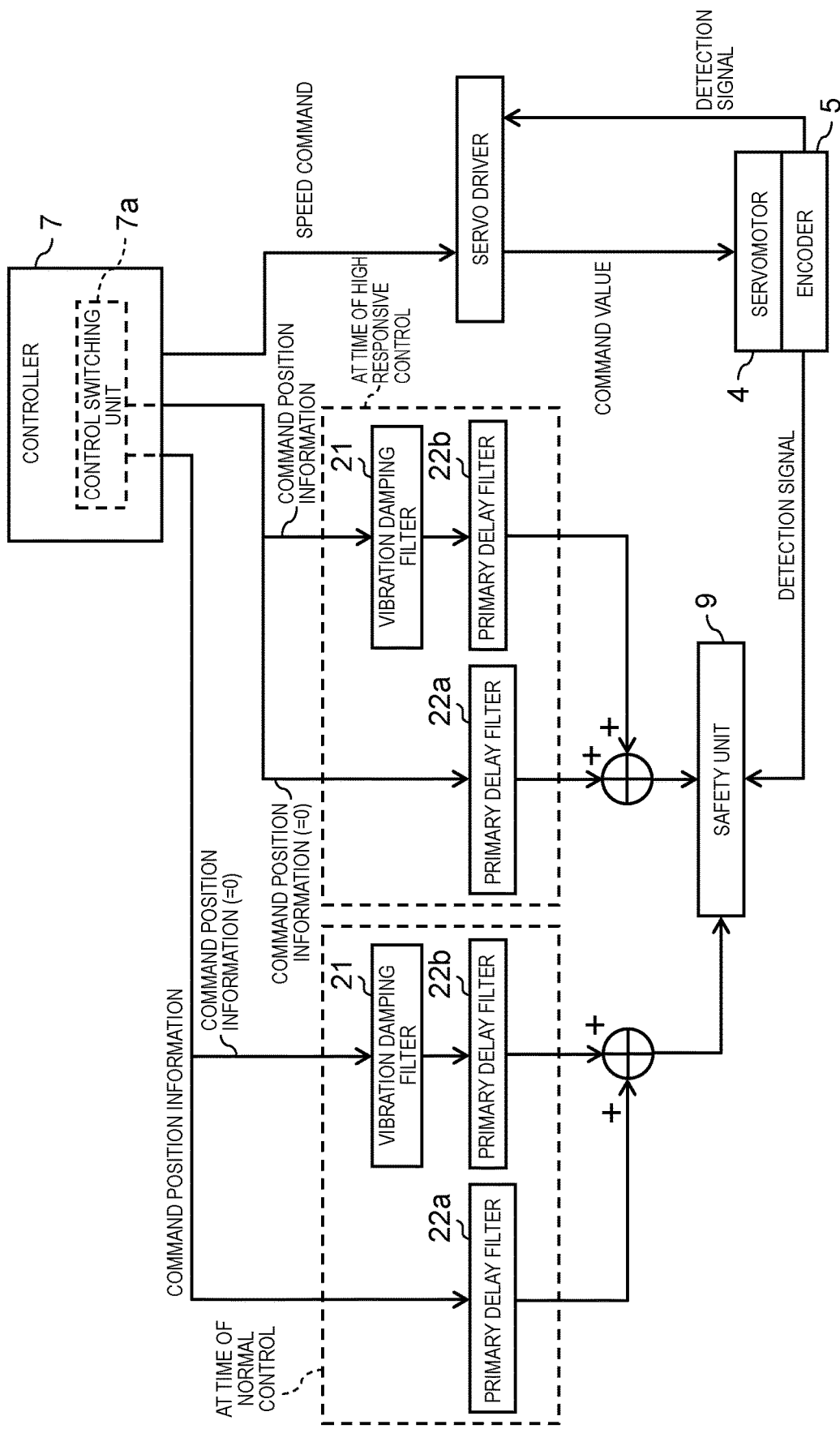
FIG. 16 is a block diagram showing still another configuration of the robot control unit according to the third exemplary embodiment.
Figure 17:
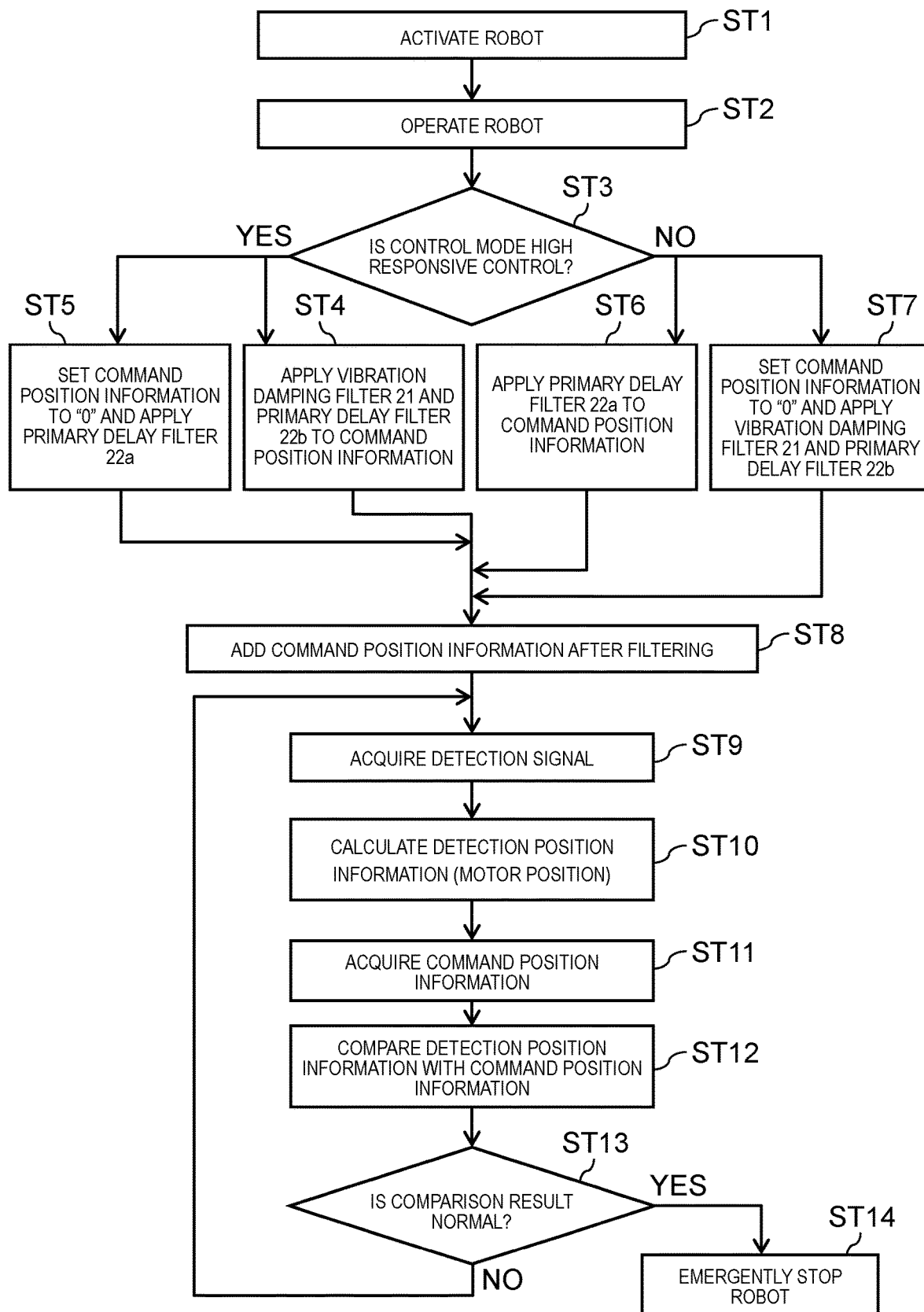
FIG. 17 is a flowchart showing another example of the abnormality determination method of the encoder according to the third exemplary embodiment.

FIG. 16 is a block diagram showing a configuration of a robot control unit according to a modification example (5). FIG. 17 is a flowchart showing a method for detecting an abnormality of encoder 5 according to the modification example (5).

The configuration shown in FIG. 16 is different from the configuration shown in FIG. 7 in that the information including the command position information transmitted from controller 7 is processed in parallel on two systems of a route processed by a filter corresponding to the drive control mode of robot A (first processing route) and a route processed by a filter not corresponding to the drive control mode of robot A (second processing route), and is transmitted to safety unit 9. In the configuration shown in FIG. 16, "0" is input as the command position information in the filter not corresponding to the drive control mode of robot A.

In the actual drive control of robot A, the process of applying the command position information to vibration damping filter 21 or primary delay filter 22 continues to be influenced until a certain time. When the switching between the drive control modes of robot A is urgent, there is a possibility that an error may be included in the command position information for the safety unit to determine due to the influence of the command position information that could not be filtered.

In the modification example, when filtering the command position information from controller 7, as shown in FIG. 16, two systems of filters are prepared. These command position information items are processed in parallel, different information is processed in each system depending on the drive control mode of robot A, and the addition result is used as new command position information.

Hereinafter, it will be described with reference to a flowchart shown in FIG. 17. In the flow shown in FIG. 17, since the processes in steps ST1, ST2, and ST9 to ST14 are the same as steps ST1 to ST8 shown in FIG. 4, the detailed description thereof is omitted here.

In step ST3, when the drive control mode of robot A is determined and the determination is the high responsive control, vibration damping filter 21 and primary delay filter 22b are applied to the command position information from controller 7 to perform filtering (step ST4).

In parallel with the process in step ST4, in step ST5, the command position information from controller 7 is set to "0", and primary delay filter 22a is applied to the command position information to perform filtering. In step ST8, the respective processing results are added and then used as command position information to be transmitted to safety unit 9.

Meanwhile, in step ST3, when determination is made that the drive control mode of robot A is the normal control, primary delay filter 22a is applied to the command position information from controller 7 to perform filtering (step ST6). In parallel with the process in step ST6, the command position information from controller 7 is set to "0", and vibration damping filter 21 and primary delay filter 22b are applied to the command position information to perform filtering (step ST7). In step ST8, the respective processing results are added and then used as command position information to be transmitted to safety unit 9.

As described above, according to the modification example, the transmission information from controller 7 is always processed in parallel by both the filter corresponding to the drive control mode of robot A and the filter not corresponding to the drive control mode.

The command position information transmitted from controller 7 is directly applied to the filter corresponding to the drive control mode of robot A while the command position information is set to "0" for the filter not corresponding to the drive control mode to perform filtering. Then, the results of filtering in both systems are added, and the added command position information is transmitted to safety unit 9 as new command position information.

By performing such processing, it is possible to absorb the difference in response delay time due to the difference in control modes, and to reduce the difference between the motor command position and the motor detection position also in a case where the drive control modes of robot A are different from each other. As a result, the abnormality detection accuracy of the encoder can be improved.

Figure 18:
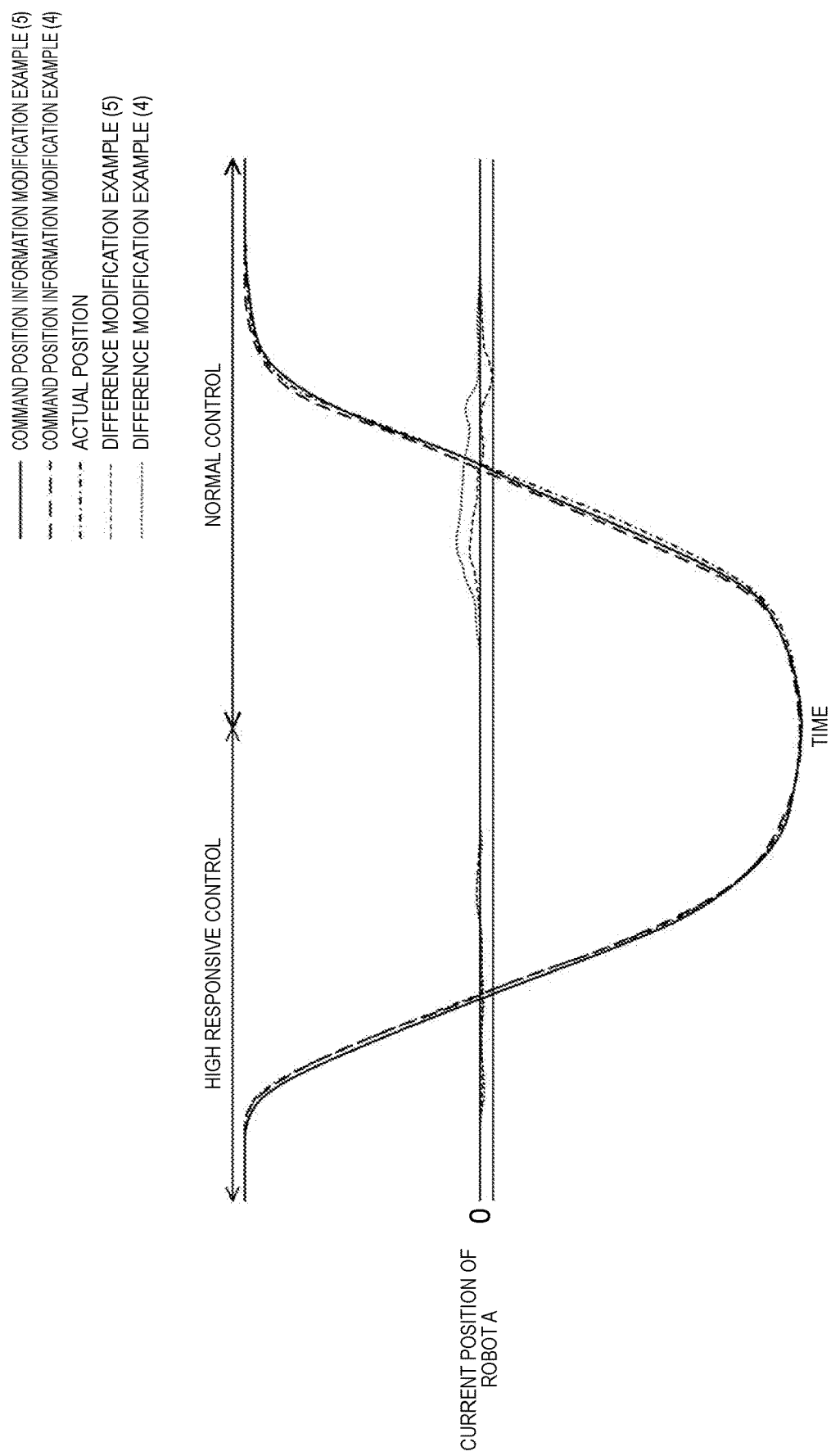
FIG. 18 is a diagram showing a temporal change in a current position of a robot according to the third exemplary embodiment.

FIG. 18 is a diagram showing a temporal change in a position of the robot according to the modification example, and shows the change in an error between a motor command position and a motor detection position in a case where joint shaft 12 of robot arm 11 is reciprocated at a high speed, high responsive control is applied to a forward path, and normal control is applied to a return path.

FIG. 18 shows, by a dotted line, the change in the difference between the motor command position and the actual motor detection position in a case where joint shaft 12 is driven with the configuration shown in FIG. 15 and shows, by a broken line, the change in the difference between the motor command position and the actual motor position in a case where joint shaft 12 is driven with the configuration shown in FIG. 16.

As is apparent from FIG. 18, by applying the configuration shown in FIG. 16, it is understood that the difference between the motor command position and the actual motor detection position is reduced.

Therefore, by using the configuration shown in FIG. 16 of the modification example (5), it becomes possible to determine the abnormality of the encoder with higher accuracy as compared with the configuration shown in FIG. 13 or FIG. 15. That is, similar to the second exemplary embodiment, the predetermined threshold value Pth can be reduced, and the abnormality detection accuracy of the encoder can be improved.

Modification Example (6)

Figure 19:
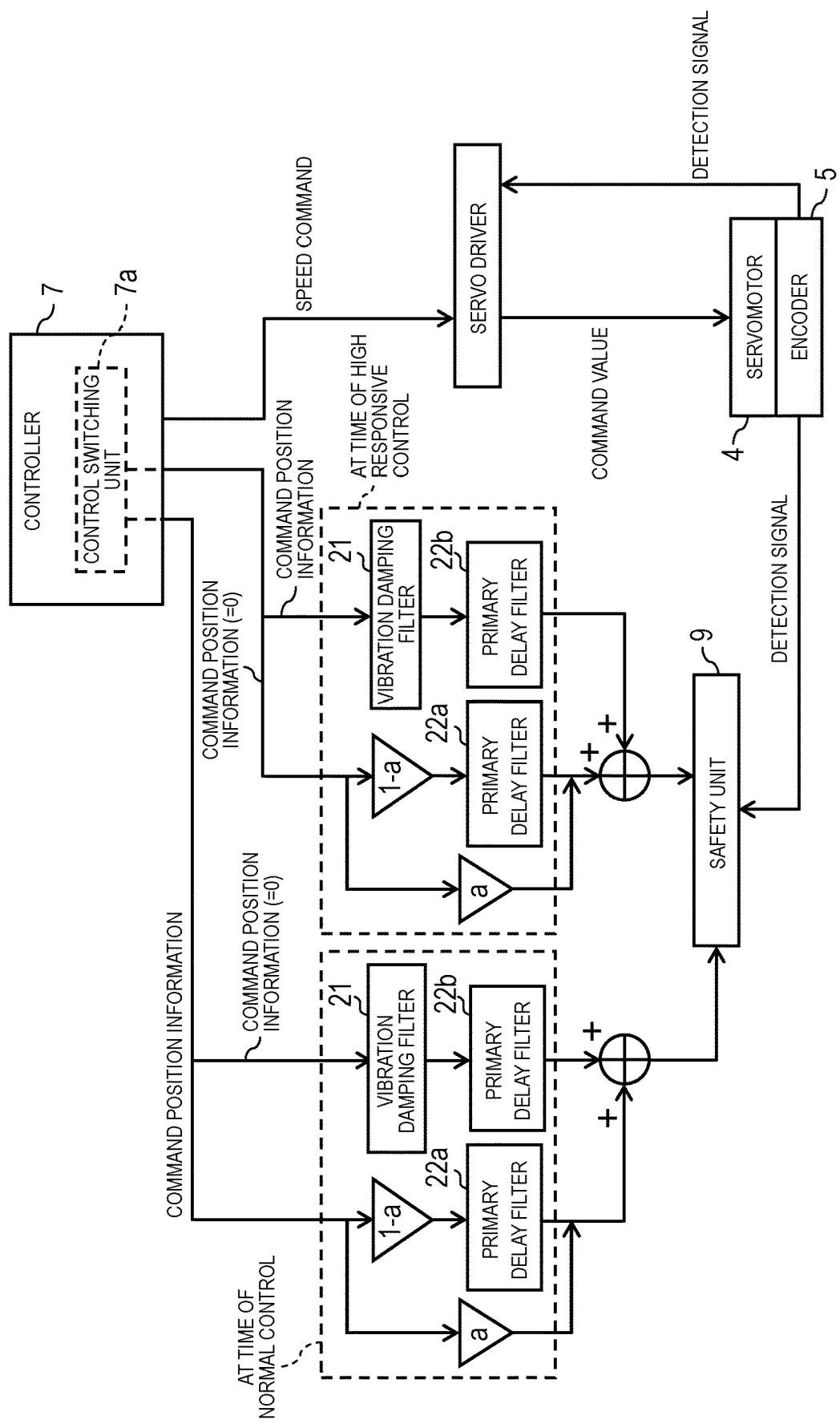
FIG. 19 is a block diagram showing still another configuration of the robot control unit according to the third exemplary embodiment.

FIG. 19 is a block diagram showing a configuration of a robot control unit according to a modification example (6).

In actual control of robot A, since servo driver 10 actually controls motor 4 after controller 7 of robot control unit 2 outputs the speed command and the command position information, and motor 4 operates based on the control, a certain time delay occurs in the actual motor position with respect to the command position information.

In order to correct this delay, as described above, the primary delay filter according to the control method is applied to the command position information, or the processing with the different filter is applied to the information including the command position information. However, since primary delay filter 22 simulates the control delay by servo driver 10, there is room for improving the precision of this primary delay.

Therefore, in the configuration shown in FIG. 19, feedforward control is performed on primary delay filter 22a used at the time of normal control so as to further improve the precision of the primary delay in the configuration shown in FIG. 16.

As shown in FIG. 19, in parallel with the processing by multiplying the gain by (1−a) times to the command position information from controller 7 and then applying it to primary delay filter 22a, the gain is multiplied by a times to the command position information, these results are added, and the added command position information is transmitted to safety unit 9.

Figure 20:
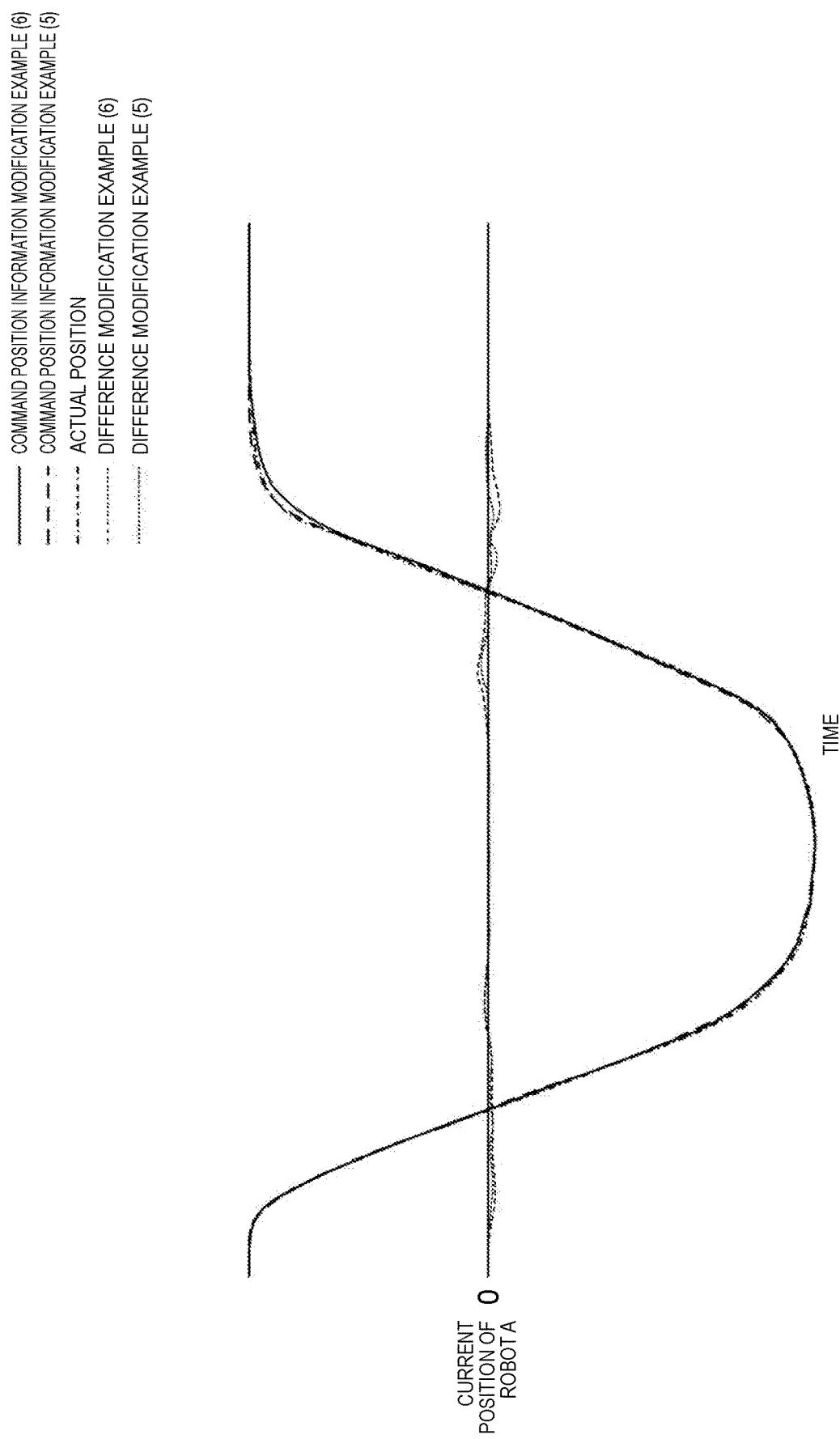
FIG. 20 is a diagram showing another example of the temporal change in the current position of the robot according to the third exemplary embodiment.
Figure 21:
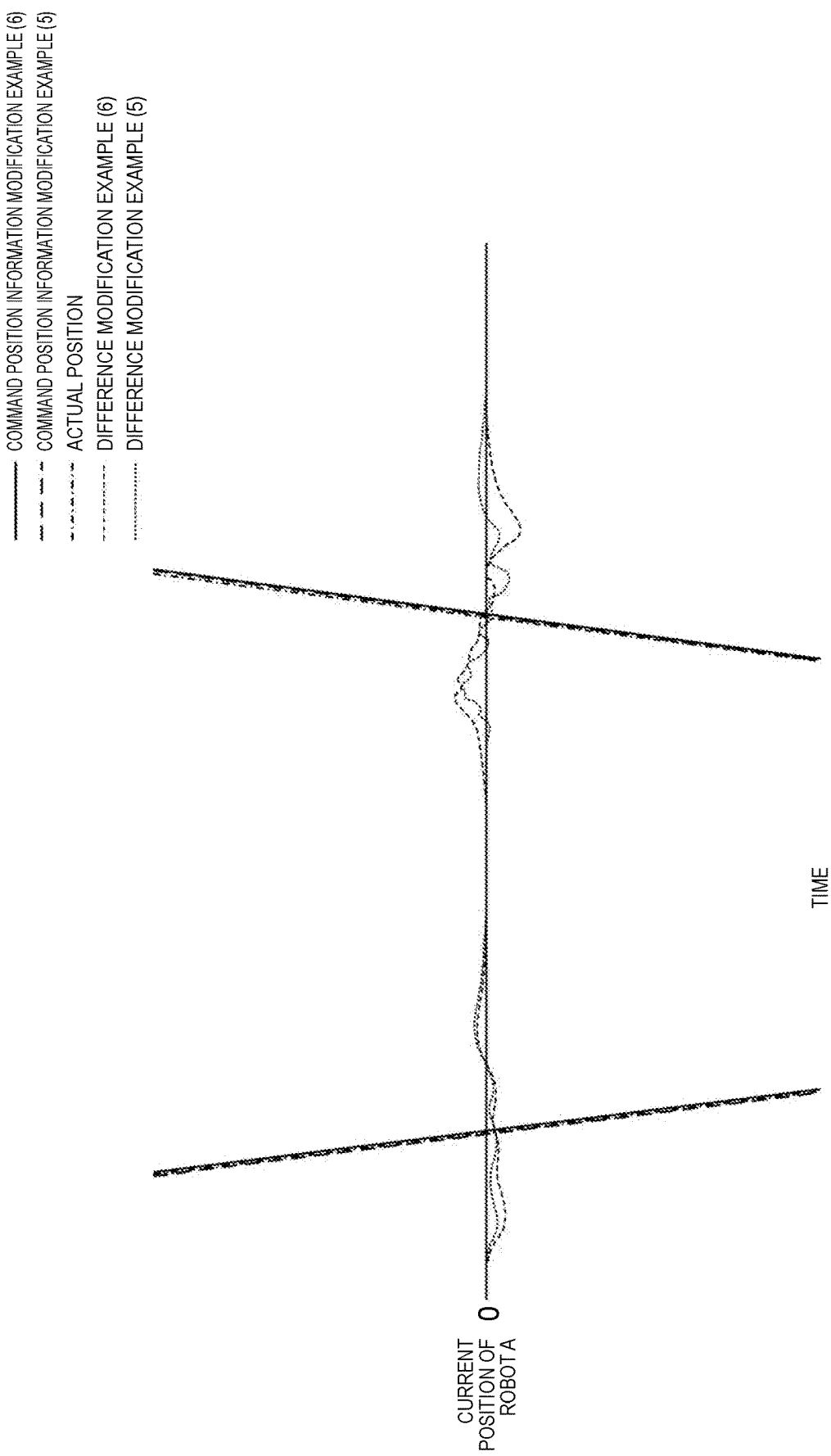
FIG. 21 is a partially enlarged view of FIG. 20.

FIG. 20 is a diagram showing a temporal change in the position of the robot according to the modification example. FIG. 20 shows the change in an error between a motor command position and a motor detection position in a case where joint shaft 12 of robot arm 11 is reciprocated at a high speed, high responsive control is applied to a forward path, and normal control is applied to a return path. FIG. 21 is a partially enlarged view of FIG. 20.

FIGS. 20 and 21 show, by a dotted line, the change in the difference between the motor command position and the actual motor detection position in a case where joint shaft 12 is driven with the configuration shown in FIG. 16. FIGS. 20 and 21 show, by a further fine dotted line, the change in the difference between the motor command position and the actual motor position in a case where joint shaft 12 is driven with the configuration shown in FIG. 19.

As is apparent from FIGS. 20 and 21, by applying the configuration shown in FIG. 19, it is understood that the difference between the motor command position and the actual motor detection position is further reduced as compared with the configuration shown in FIG. 16.

According to the modification example, it becomes possible to determine the abnormality of the encoder with higher accuracy as compared with the configuration shown in the modification example (5).

Although the configuration in which the feedforward control is performed on primary delay filter 22a has been described in the modification example, the same effect can be obtained by performing the feedforward control in the same manner also for primary delay filter 22b.

As described above, the abnormality detection method of the present disclosure is an abnormality detection method for detecting an abnormality of an encoder that detects a rotational position of a motor that drives an output shaft of an operation device. A controller that outputs a speed command for instructing the rotational position of the motor and command position information indicating the rotational position of the motor according to the speed command, a driver that receives the speed command output from the controller and an output signal output from the encoder and controls driving of the motor based on the speed command and the output signal, and an abnormality detection device that detects an abnormality of the encoder are provided. The abnormality detection device is characterized by performing an information acquisition step of acquiring the command position information from the controller and the output signal from the encoder, respectively, and an abnormality determination step of comparing the command position information with detection position information of the motor calculated based on the output signal and in a case where a difference between the both position information items is equal to or more than a predetermined value, determining that the encoder is abnormal.

With the method, the abnormality detection device determines the abnormality of the encoder based on the comparison result between the command position information received from the controller and the detection position information calculated based on the output signal from the encoder. This makes it possible to detect an abnormality of the encoder without adding a new configuration or function for detecting the abnormality of the encoder to the driver. That is, for example, it becomes possible to detect an abnormality of the encoder while minimizing the influence on the existing configuration and the existing circuit of a general operation device (for example, robot or external shaft).

In the abnormality determination step, it is preferable that the abnormality detection device compensates for a time delay caused by a delay of drive control of the motor with respect to the command position information acquired from the controller and determines presence or absence of an abnormality of the encoder based on a comparison result between the command position information in which the time delay is compensated for and the detection position information.

By delaying the command position information used for determining the abnormality of the encoder in this way, it is possible to eliminate the time delay due to the delay of the motor drive control, so that the abnormality detection accuracy of the encoder can be improved.

It is preferable that the controller performs a control mode detection step of detecting switching between the drive control modes of the operation device and a processing route switching step of switching processing routes of the command position information depending on switching between the drive control modes, and the abnormality detection device receives the command position information processed on the processing route according to the drive control mode.

With the method, it is possible to reduce the error between the command position information and the detection position information due to the difference in the drive control modes of the operation device, and to improve the abnormality detection accuracy of the encoder.

It is preferable that the method includes a step of processing the command position information output from the controller in a first processing route corresponding to a detected actual drive control mode, a step of processing position information corresponding to an origin position of the motor as the command position information in a second processing route not corresponding to the actual drive control mode, and a step of adding the command position information items processed on the first processing route and the second processing route, and the abnormality detection device receives the added command position information.

With the method, even in a case where the processing routes of command processing information vary due to the switching between the drive control modes of the operation device, it is possible to absorb the difference in the response delay time due to the difference in the processing mode, and to reduce the difference between the motor command position and the motor detection position. As a result, the abnormality detection accuracy of the encoder can be improved.

It is preferable that in at least one of the first processing route or the second processing route, a delay compensation step of compensating for a time delay of the command position information is performed, and in the delay compensation step, feedforward control is performed.

With the method, it is possible to further reduce the error at the time delay compensation and to reduce the difference between the motor command position and the motor detection position. As a result, the abnormality detection accuracy of the encoder can be improved.

It is preferable that in the abnormality determination step, the abnormality detection device generates an integrated value of a change amount of the command position information output from the controller, and determines presence or absence of an abnormality of the encoder based on a comparison result between a sum of the integrated value and the command position information and the detection position information.

As described above, the margin in the abnormality determination is increased by adding the integrated value to the command position information used for determining the abnormality of the encoder, and it is possible to prevent the abnormality detection device from determining that the encoder is abnormal despite the normal operation of the encoder.

It is preferable that in the abnormality determination step, the abnormality detection device determines presence or absence of an abnormality of the encoder based on a comparison result between a value obtained by adding a predetermined offset value to the sum of the integrated value and the command position information and the detection position information.

With the method, by comparing the value obtained by adding the offset value to the sum of the integrated value and the command position information with the detection position information, for example, in a case where the operation device is not operating or the like, when there is no change in period command position information, the abnormality of the encoder can be detected even when a differential device performs an unintended operation.

It is preferable that a safety circuit for causing the operation device to emergently stop is further provided, the controller is configured to transmit an emergency stop signal to the safety circuit in emergency, and in the abnormality determination step, in a case where it is detected that the emergency stop signal has been output from the controller, the abnormality detection device does not determine that the encoder is abnormal even when the difference between the both position information items is equal to or more than a predetermined value.

With the method, since determination is not made that the encoder is abnormal even when the difference between the command position information and the detection position information is equal to or more than a predetermined value after the controller outputs the emergency stop signal, for example, in a case where the controller stops outputting the speed command and command position information after outputting the emergency stop signal, it is possible to prevent determination that the encoder is abnormal despite the normal operation of the encoder.

The abnormality detection device disclosed herein detects an abnormality of the encoder for detecting the rotational position of the motor that drives the output shaft of the operation device. The abnormality detection device includes a controller that outputs a speed command for instructing the rotational position of the motor and command position information indicating the rotational position of the motor according to the speed command, a driver that receives the speed command output from the controller and an output signal output from the encoder and controls driving of the motor based on the speed command and the output signal, and an abnormality detection device that detects an abnormality of the encoder. The abnormality detection device includes a first receiver that receives the output signal from the encoder, a second receiver that receives the command position information from the controller, and a determiner that compares the command position information with detection position information of the motor calculated based on the output signal, and determines that the encoder is abnormal in a case where a difference between the both position information items is equal to or more than a predetermined value.

With the apparatus, it becomes possible to detect an abnormality of the encoder without adding a new function for detecting the abnormality of the encoder to the driver as in the above-described abnormality detection method.

The control system of a robot having an output shaft and having a motor that drives the output shaft disclosed herein includes an encoder that detects a rotational position of the motor, a controller that outputs a speed command for instructing the rotational position of the motor and command position information indicating the rotational position of the motor according to the speed command, a driver that receives the speed command output from the controller and an output signal output from the encoder and controls driving of the motor based on the speed command and the output signal, and an abnormality detection device that detects an abnormality of the encoder. The abnormality detection device includes a first receiver that receives the output signal from the encoder, a second receiver that receives the command position information from the controller, and a determiner that compares the command position information with detection position information of the motor calculated based on the output signal and determines that the encoder is abnormal in a case where a difference between the both position information items is equal to or more than a predetermined value.

With the control system, it becomes possible to detect an abnormality of the encoder without adding a new function for detecting the abnormality of the encoder to the driver as in the above-described abnormality detection method.

As described above, with the abnormality detection method of an encoder of the present disclosure, it is possible to detect an abnormality of the encoder while minimizing the influence on existing functions and existing devices even in a case where a general-purpose encoder is used.

INDUSTRIAL APPLICABILITY

Since the abnormality detection method of an encoder of the present disclosure can determine an abnormality of the encoder while minimizing the influence on existing functions and existing devices even in a case where a general-purpose encoder is used, it is particularly useful for determining an abnormality of an encoder related to an industrial robot such as a general purpose welding robot or an encoder related to other operation devices.

REFERENCE MARKS IN THE DRAWINGS

A ROBOT (OPERATION DEVICE)
C CONNECTION CABLE
P MOTOR DETECTION VALUE
1 ROBOT MECHANISM PART
2 ROBOT CONTROL UNIT
3 OPERATING PART
4 MOTOR
5 ENCODER
6 SAFETY CIRCUIT
7 CONTROLLER
7a CONTROL SWITCHING UNIT
9 SAFETY UNIT (ABNORMALITY DETECTION DEVICE)
10 SERVO DRIVER
11 ROBOT ARM
12 JOINT SHAFT (OUTPUT SHAFT)
21 VIBRATION DAMPING FILTER
22 PRIMARY DELAY FILTER (DELAY CONTROL FILTER)
22a PRIMARY DELAY FILTER
22b PRIMARY DELAY FILTER
92 CPU (DETERMINER)
94 ENCODER RECEIVER (FIRST RECEIVER)
95 DPRAM (SECOND RECEIVER)

The invention claimed is:

1. An abnormality detection method of an encoder for detecting an abnormality of the encoder by using a robot control unit, the encoder detecting a rotational position of a motor that drives an output shaft of an operation device,
the robot control unit including
a controller that outputs a speed command and command position information, the speed command being a command for instructing a velocity of the motor, and the command position information indicating the rotational position of the motor calculated from the speed command,
a driver connected to the encoder and the controller, and
an abnormality detection device connected to the encoder and the controller,
the method comprising:
an output step of outputting the speed command and the command position information;
a control step of receiving the speed command and an output signal output from the encoder, and controlling driving of the motor based on the speed command and the output signal;
an information acquisition step of acquiring the command position information from the controller, and acquiring the output signal from the encoder; and
an abnormality determination step of calculating detection position information of the motor based on the acquired output signal, comparing the command position information with the calculated detection position information of the motor, and determining that the encoder is abnormal in a case where a difference between the command position information and the detection position information of the motor is equal to or more than a predetermined value.

2. The abnormality detection method of an encoder of claim 1, further comprising:
a step of compensating for a time delay caused by a delay of drive control of the motor with respect to the command position information.

3. The abnormality detection method of an encoder of claim 1, further comprising:
a step of removing a resonance component from the command position information.

4. The abnormality detection method of an encoder of claim 1, further comprising:
a control mode detection step of detecting switching between drive control modes of the operation device; and
a processing route switching step of switching processing routes of the command position information depending on the switching between the drive control modes.

5. The abnormality detection method of an encoder of claim 4,
wherein depending on the switching between the processing routes, the abnormality detection device receives command position information in which a time delay caused by a delay of drive control of the motor is compensated for, or command position information in which a resonance component is removed and the time delay is compensated for.

6. The abnormality detection method of an encoder of claim 5,
wherein depending on the switching between the processing routes, a compensation amount of the time delay of the command position information varies.

7. The abnormality detection method of an encoder of claim 4, further comprising:
a step of processing the command position information output from the controller in a first processing route corresponding to a detected drive control mode;
a step of processing position information corresponding to an origin position of the motor as the command position information in a second processing route not corresponding to the drive control mode; and
a step of adding command position information items processed in the first processing route and the second processing route,
wherein the abnormality detection device receives the added command position information.

8. The abnormality detection method of an encoder of claim 7,
wherein in at least one of the first processing route and the second processing route, a delay compensation step of compensating for a time delay of the command position information is performed, and in the delay compensation step, feedforward control is performed.

9. The abnormality detection method of an encoder of claim 1,
wherein in the abnormality determination step, the abnormality detection device generates an integrated value of a change amount of the command position information output from the controller, and determines presence or absence of an abnormality of the encoder based on a comparison result between a sum of the integrated value and the command position information and the detection position information.

10. The abnormality detection method of an encoder of claim 9,
wherein in the abnormality determination step, the abnormality detection device determines presence or absence of an abnormality of the encoder based on a comparison result between a value obtained by adding a predetermined offset value to the sum of the integrated value and the command position information and the detection position information.

11. The abnormality detection method of an encoder of claim 1,
wherein the robot control unit further includes a safety circuit for causing the operation device to emergently stop,
wherein the controller is configured to transmit an emergency stop signal to the safety circuit in emergency, and
wherein in the abnormality determination step, in a case where the abnormality detection device detects that the emergency stop signal has been output from the controller, the abnormality detection device does not determine that the encoder is abnormal even when the difference between the command position information and the detection position information of the motor is equal to or more than the predetermined value.

12. The abnormality detection method of an encoder of claim 1,
wherein the operation device is a robot.

13. An abnormality detection device of an encoder for detecting an abnormality of the encoder, the abnormality detection device being connected to the encoder and a controller, the controller outputting a speed command instructing a velocity of the motor that drives an output shaft of an operation device and command position information calculated from the speed command, the encoder detecting and outputting a rotational position of the motor, the abnormality detection device comprising:
a first receiver that receives an output signal outputted from the encoder;
a second receiver that receives the outputted command position information from the controller; and
a processor that calculates detection position information of the motor based on the output signal received by the first receiver, compares the calculated command position information received by the second receiver with the calculated detection position information of the motor, and determines that the encoder is abnormal in a case where a difference between the command position information and the detection position information of the motor is equal to or more than a predetermined value.

14. The abnormality detection device of an encoder of claim 13, further comprising:
a delay control filter that compensates for a delay of drive control of the motor by a driver between the controller and the abnormality detection device.

15. The abnormality detection device of an encoder of claim 14,
wherein a vibration damping filter that suppresses vibration of the motor is provided between the driver and the motor, and
wherein a vibration damping filter connected in series with the delay control filter is provided between the controller and the abnormality detection device.

16. The abnormality detection device of an encoder of claim 13,
wherein the controller includes a control switching unit that detects switching between drive control modes of the operation device and that switches processing routes for the command position information transmitted from the controller to the abnormality detection device,
wherein between the controller and the abnormality detection device,
a first delay control filter that compensates for a delay of drive control of the motor and a second delay control filter that compensates for the delay of the drive control of the motor are connected in parallel with each other, and
the second delay control filter and a vibration damping filter that suppresses vibration of the motor are provided in series, and
wherein depending on the switching between the processing routes in the control switching unit, the command position information is transmitted to the first delay control filter, or to the vibration damping filter and the second delay control filter.

17. The abnormality detection device of an encoder of claim 16,
wherein time constants of the first delay control filter and the second delay control filter are equal to each other.

18. The abnormality detection device of an encoder of claim 16,
wherein time constants of the first delay control filter and the second delay control filter are different from each other.

19. A robot control system comprising:
an encoder that detects a rotational position of a motor;
a controller that outputs a speed command and command position information, the speed command being a command for instructing a velocity of the motor, and the command position information indicating the rotational position of the motor calculated from the speed command;
a driver that receives the speed command output from the controller and an output signal output from the encoder and controls driving of the motor based on the speed command and the output signal; and
an abnormality detection device connected to the encoder and the controller,
wherein the abnormality detection device includes:
a first receiver that receives the output signal outputted from the encoder;
a second receiver that receives the outputted command position information from the controller; and
a processor that calculates detection position information of the motor based on the output signal received by the first receiver, compares the command position information received by the second receiver with the calculated detection position information of the motor, and determines that the encoder is abnormal in a case where a difference between the command position information and the detection position information of the motor is equal to or more than a predetermined value.

\* \* \* \* \*